(12) United States Patent
Clediere

(10) Patent No.: US 10,955,990 B2
(45) Date of Patent: *Mar. 23, 2021

(54) REAL-TIME DELIVERY OF INTERACTIONS IN ONLINE SOCIAL NETWORKING SYSTEM

(71) Applicant: Facebook, Inc., Menlo Park, CA (US)

(72) Inventor: Robin Maxime Clediere, Lynnwood, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,566

(22) Filed: May 2, 2019

(65) Prior Publication Data

US 2019/0258382 A1 Aug. 22, 2019

Related U.S. Application Data

(63) Continuation of application No. 15/490,666, filed on Apr. 18, 2017, now Pat. No. 10,338,767.

(51) Int. Cl.
*G06F 3/048* (2013.01)
*G06F 3/0481* (2013.01)
*G06F 3/0482* (2013.01)
*H04L 12/58* (2006.01)
*H04L 29/08* (2006.01)
(Continued)

(52) U.S. Cl.
CPC ........ *G06F 3/04817* (2013.01); *G06F 3/0482* (2013.01); *G06F 3/0485* (2013.01); *G06F 3/0488* (2013.01); *G06Q 10/10* (2013.01); *G06Q 30/02* (2013.01); *G06Q 50/01* (2013.01);
(Continued)

(58) Field of Classification Search
CPC ...... G06F 3/0482; G06F 3/0488; G06F 3/017; G06F 3/011; G06F 2203/011; G06F 3/04842; G06F 16/743; G06F 3/04817; G06K 9/00771; G06T 13/80; G06T 13/20; G06T 13/00
See application file for complete search history.

(56) References Cited

U.S. PATENT DOCUMENTS

D485,279 S 1/2004 DeCombe
D49,973 S 12/2011 Matas
(Continued)

OTHER PUBLICATIONS

United States Office Action, U.S. Appl. No. 29/679,218, dated Mar. 6, 2020, nine pages.

*Primary Examiner* — Linh K Pham
(74) *Attorney, Agent, or Firm* — Fenwick & West LLP

(57) ABSTRACT

A content item is sent for display on client devices of users of an online system. Information indicating that a first user is currently viewing the content item is received from a client device. A second user connected to the first user is identified. The second user is performing a user interaction with the content item while the first user is currently viewing the content item. An emotion associated with the user interaction is determined. A widget identifying the second user and the emotion is sent for display to the client device. The widget is configured to move across the content item displayed on the client device while the first user is currently viewing the content item. Responsive to receiving from the client device a user interaction with the widget, information is sent for display indicating the second user in a field for receiving comments by the first user.

20 Claims, 11 Drawing Sheets

(51) Int. Cl.
*G06F 3/0488* (2013.01)
*G06F 3/0485* (2013.01)
*G06Q 50/00* (2012.01)
*G06Q 30/02* (2012.01)
*G06Q 10/10* (2012.01)
*H04L 29/06* (2006.01)

(52) U.S. Cl.
CPC .............. *H04L 51/32* (2013.01); *H04L 67/22* (2013.01); *H04L 67/38* (2013.01)

(56) References Cited

U.S. PATENT DOCUMENTS

| | | | |
|---|---|---|---|
| D712,918 S | 9/2014 | Frick et al. | |
| D715,820 S | 10/2014 | Rebstock | |
| D720,765 S | 1/2015 | Xie et al. | |
| D753,676 S | 4/2016 | Oh et al. | |
| 9,325,653 B1 | 4/2016 | Peterson et al. | |
| D757,748 S | 5/2016 | Butcher et al. | |
| D759,723 S | 6/2016 | Butcher et al. | |
| D760,251 S | 6/2016 | Myung et al. | |
| D760,773 S | 7/2016 | Cho et al. | |
| D762,713 S | 8/2016 | Raykovich et al. | |
| D765,099 S | 8/2016 | Kim et al. | |
| D770,491 S | 11/2016 | Jung | |
| D774,078 S | 12/2016 | Kisselev et al. | |
| D776,147 S | 1/2017 | Simmons et al. | |
| D777,745 S | 1/2017 | Ta | |
| D778,306 S | 2/2017 | Park et al. | |
| D778,929 S | 2/2017 | Mensinger et al. | |
| D780,775 S | 3/2017 | Rad et al. | |
| D788,137 S | 5/2017 | Zhu et al. | |
| 9,647,964 B2 | 5/2017 | Choi | |
| D789,384 S | 6/2017 | Lin et al. | |
| D791,169 S | 7/2017 | Sun | |
| D791,787 S | 7/2017 | Lieb et al. | |
| D791,818 S | 7/2017 | Sun | |
| D792,903 S | 7/2017 | Park et al. | |
| D794,061 S | 8/2017 | Campbell et al. | |
| D797,785 S | 9/2017 | Dixit et al. | |
| D798,900 S | 10/2017 | Wan et al. | |
| D801,987 S | 11/2017 | Little et al. | |
| D802,619 S | 11/2017 | Kim et al. | |
| D804,524 S | 12/2017 | Zin et al. | |
| D807,899 S | 1/2018 | Hilhorst et al. | |
| D808,998 S | 1/2018 | Wu et al. | |
| D812,079 S | 3/2018 | Felt | |
| D812,623 S | 3/2018 | Asai et al. | |
| D812,627 S | 3/2018 | Gershon et al. | |
| D814,510 S | 4/2018 | Cornell | |
| D815,127 S | 4/2018 | Phillips et al. | |
| D815,128 S | 4/2018 | Phillips et al. | |
| D819,040 S | 5/2018 | Grace et al. | |
| D830,375 S | 10/2018 | Phillips et al. | |
| D831,032 S | 10/2018 | Lee et al. | |
| D831,671 S | 10/2018 | Laing et al. | |
| D832,278 S | 10/2018 | Cognetta | |
| D834,612 S | 11/2018 | Clediere | |
| D835,134 S | 12/2018 | Tang et al. | |
| D835,663 S | 12/2018 | Ho et al. | |
| D835,672 S | 12/2018 | Vijay et al. | |
| D845,967 S | 4/2019 | Clediere et al. | |
| 2008/0235285 A1 | 9/2008 | Della Pasqua | |
| 2012/0331063 A1* | 12/2012 | Rajaram | G06Q 50/01 709/206 |
| 2013/0073990 A1 | 3/2013 | Park et al. | |
| 2014/0089816 A1 | 3/2014 | DiPersia et al. | |
| 2014/0192134 A1 | 7/2014 | Jung et al. | |
| 2015/0206000 A1 | 7/2015 | el Kaliouby et al. | |
| 2015/0370472 A1* | 12/2015 | Privault | G06F 3/017 715/769 |
| 2016/0205049 A1 | 7/2016 | Kim et al. | |
| 2016/0241500 A1 | 8/2016 | Bostick et al. | |
| 2016/0269328 A1* | 9/2016 | Pola | H04L 51/046 |
| 2016/0295384 A1 | 10/2016 | Shan et al. | |
| 2016/0301639 A1 | 10/2016 | Liu et al. | |
| 2016/0357402 A1 | 12/2016 | Matas et al. | |
| 2017/0041272 A1 | 2/2017 | Chang et al. | |
| 2017/0127128 A1 | 5/2017 | Seger | |
| 2017/0154055 A1 | 6/2017 | Dimson et al. | |
| 2017/0235438 A1 | 8/2017 | Atalla | |
| 2017/0262431 A1 | 9/2017 | Alam et al. | |
| 2017/0308267 A1 | 10/2017 | Kozloski et al. | |
| 2017/0308589 A1 | 10/2017 | Liu et al. | |
| 2017/0315699 A1 | 11/2017 | Markus et al. | |
| 2018/0081448 A1 | 3/2018 | Woo et al. | |
| 2018/0124477 A1* | 5/2018 | Qu | H04N 21/25891 |
| 2018/0331989 A1* | 11/2018 | Bastide | H04L 51/046 |

\* cited by examiner

REAL-TIME DELIVERY OF INTERACTIONS IN ONLINE SOCIAL NETWORKING SYSTEM

CROSS REFERENCE TO RELATED APPLICATIONS

This application is a continuation of co-pending U.S. application Ser. No. 15/490,666, filed Apr. 18, 2017, which is incorporated by reference in its entirety.

BACKGROUND

This invention relates generally to online social networking systems, and in particular to real-time delivery of user interactions with electronic media content items presented via client devices within a social networking system.

Online social networking systems often present electronic media content items to users. For example, a social networking system may present an online news article in a newsfeed. Such content items are viewed by users on client devices, for example, a laptop or a mobile device. Social networking systems allow users to connect and interact with each other, and allow users to post and interact with content items displayed by the system. For example, users may interact with content items on a social networking system by expressing approval of a content item (e.g., "liking" a content item), adding additional content to the content item (e.g., posting a "comment" on a content item), and sharing a content item with other users of the social networking system.

However, users may not see reactions of other users that would be of interest to them because the interactions of interest may be aggregated with other interactions or because the number of interactions with the content item is too large. A user may not see another user's reaction until long after the interaction occurred, thereby preventing the user from further interacting with the other user in a timely way. In addition, a user scrolling down a newsfeed may not see a reaction from another user because the notification of the reaction may be displayed at the very top of the newsfeed beyond the screen of the client device that may not be visible to the user who is viewing the bottom of the newsfeed on the screen. A user may be less likely to engage with the user's social network if other users' reactions are not delivered efficiently to the user.

SUMMARY

A social networking system provides real-time reaction information for content items, permitting users to quickly identify when content items of interest are being viewed and interacted with by other users. The social networking system may filter the user reactions to display those reactions most likely to be of interest to the user. As the user is viewing a content item, such as while the user is scrolling through the comments on the content item, the live reactions of other users associated with the content item are displayed moving across the screen of the user's client device. Thus, even though a portion of the interface associated with the content item that displays reactions of other users is not currently visible to a viewing user (e.g., the user has scrolled away from this section), the user is still kept informed of reactions by other users generally as they are occurring.

In an embodiment, the social networking system sends, for display on client devices of users, a content item amongst other content items associated with the users. The system receives, from a client device of a first user of the social networking system, information indicating that the first user is currently viewing the content item. Responsive to receiving the information, the system identifies a second user connected to the first user within the social networking system, where the second user is performing a user interaction with the content item while the first user is currently viewing the content item. The system determines a type of emotion associated with the user interaction performed by the second user. The system sends for display to the client device a widget identifying the second user and/or identifying the type of emotion. The widget moves across the content item (e.g., across a comments section of a content item) displayed on the client device while the first user is currently viewing the content item. In some embodiments, responsive to receiving from the client device a user interaction by the first user with the widget, the system sends for display to the client device information indicating the second user in a field for receiving comments by the first user. Thus, the first user can easily write a comment on the content item that identifies the second user, and in some cases this identification tags the second user in the comment such that the second user is notified that the first user mentioned him in a comment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system provides for display on a client device, such as on a newsfeed or a permalink, content items, where each content item has one or more comments. A permalink is a view of the content item itself, such as a separate page that the user is taken to when selecting a content item in the newsfeed for viewing, where the separate page includes only that content item and associated comments/reactions. As a user is viewing the comments, the live reactions of other users on the content item are displayed moving across a portion of the content item, such as a section including the comments. As the viewing user is scrolling through the content item, such as scrolling through the comments for the content item, the social networking system receives and provides for display to the viewing user, one or more reactions to the content item by other users connected to the viewing user (e.g., floating across the comments field). The displayed reaction indicates which other user had the reaction. For example, the displayed reaction may include a user profile picture of the other user. The user profile picture of the other user may move vertically up the client device from the bottom to the top of the screen. As another example, after a threshold time period, the system displays a reaction icon in place of the user profile picture of the other user, where the icon expresses the reaction of the user (e.g., like, love, angry, sad, etc.). In some embodiments, the social networking system receives from the viewing user, a selection of one of the displayed icons or widgets. In response to the selection (e.g., a tap on the icon or a mouse over the icon), the social networking system provides for display information about the other user (e.g., the name of the other user) within a comments field, such that the viewing user can enter a comment about that user. If the user provides a comment, the system provides for display to the viewing user and the other user the comment including the name of the other user. In some embodiments, this tags the other user such that the other user receives a notification that he was mentioned in a comment.

System Environment and Architecture

Figure 1:
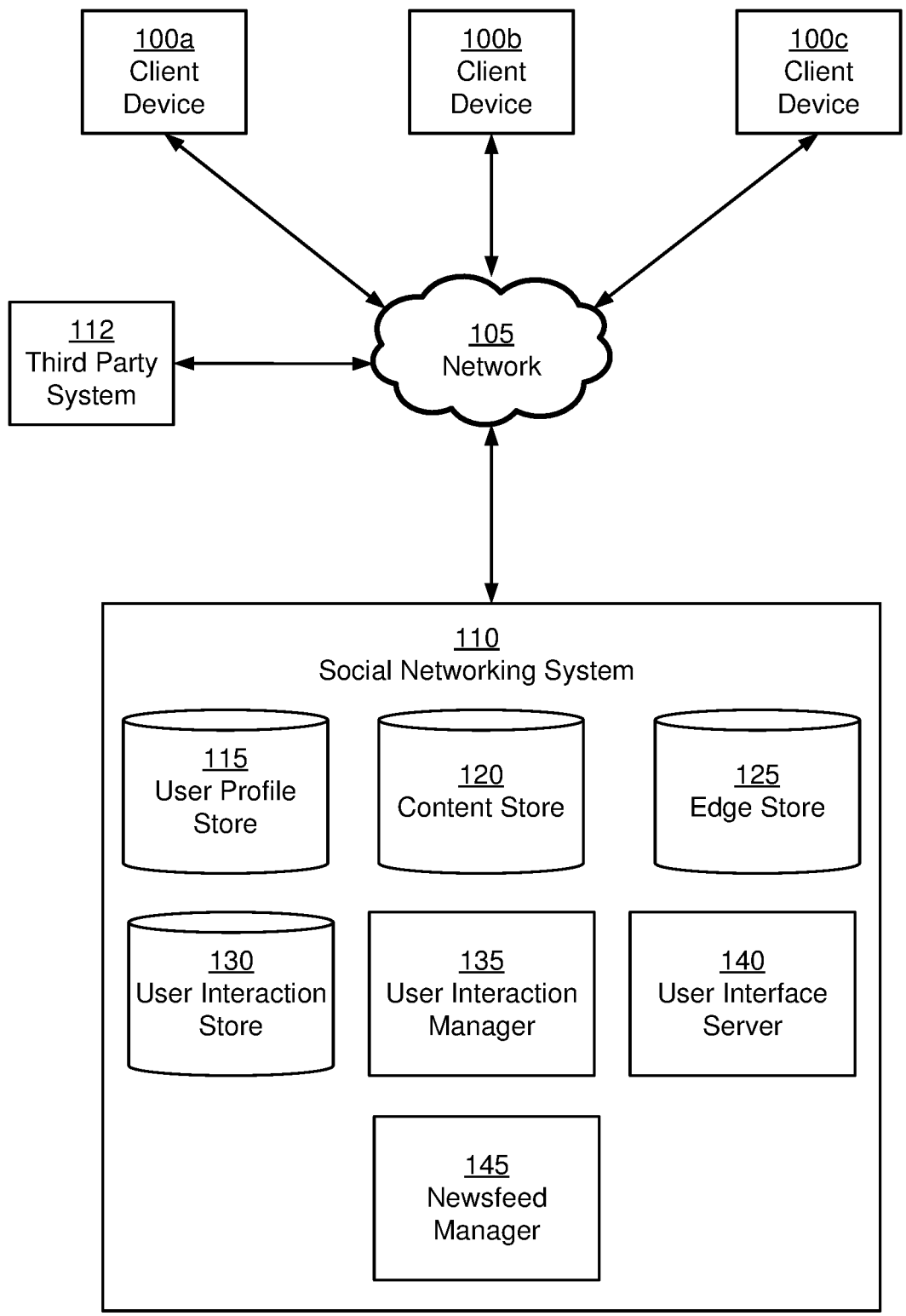
FIG. 1 is a block diagram of a system environment and architecture of a social networking system, in accordance with an embodiment.

FIG. 1 is a block diagram of a system environment and architecture of a social networking system 110, in accordance with an embodiment. The system environment shown in FIG. 1 includes one or more client devices 100, a network 105, one or more third-party systems 112, and the social networking system 110. FIG. 1 and the other figures use like reference numerals to identify like elements. A letter after a reference numeral, such as "100a," indicates that the text refers specifically to the element having that particular reference numeral. A reference numeral in the text without a following letter, such as "100," refers to any or all of the elements in the figures bearing that reference numeral, e.g., "100" in the text refers to reference numerals "100a" and/or "100b" in the figures. In alternative configurations, different and/or additional components may be included in the system environment. The embodiments described herein can be adapted to online systems that are not social networking systems.

The social networking system 110 shown in FIG. 1 sends content items associated with users of the social networking system 110 for display on client devices 100 of the users of the social networking system 100. The client devices 100 are one or more computing devices capable of receiving user input as well as transmitting and/or receiving data via the network 105. In one embodiment, a client device 100 is a conventional computer system, such as a desktop or laptop computer. Alternatively, a client device 100 may be a device having computer functionality, such as a personal digital assistant (PDA), a mobile telephone, a smartphone or another suitable device. Each client device 100 is configured to communicate via the network 105. In one embodiment, a client device 100 executes an application allowing a user of the client device 100 to interact with the social networking system 110. For example, a client device 110 executes a browser application to enable interaction between the client device 100 and the social networking system 110 via the network 105. In another embodiment, a client device 100 interacts with the social networking system 110 through an application programming interface (API) running on a native operating system of the client device 100, such as IOS® or ANDROID™.

The network 105 may comprise any combination of local area and wide area networks employing wired or wireless communication links. In one embodiment, the network 105 uses standard communications technologies and protocols. For example, the network 105 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 105 may be represented using any suitable format, such as hypertext markup language (HTML) or extensible markup language (XML). In some embodiments, all or some of the communication links of the network 105 may be encrypted using any suitable technique.

One or more third party systems 112 may be coupled to the network 105 for communicating with the social networking system 110. In one embodiment, a third party system 112 is an application provider communicating information describing applications for execution by a client device 100 or communicating data to client devices 100 for use by an application executing on the client device. In other embodiments, a third party system 112 provides content or other information for presentation via a client device 100. A third party website 112 may also communicate information to the social networking system 110, such as advertisements, content, or information about an application provided by the third party website 112.

The social networking system 110 shown in FIG. 1 includes a user profile store 115, a content store 120, an edge store 125, a user interaction store 130, a user interaction manager 135, a newsfeed manager 145, and a user interface server 140. In other embodiments, the social networking system 110 may include additional, fewer, or different components for various applications. Conventional components such as network interfaces, security functions, load balancers, failover servers, management and network operations consoles, and the like are not shown so as to not obscure the details of the system architecture.

Each user of the social networking system 110 is associated with a user profile, which is stored in the user profile store 115. A user profile includes declarative information about the user that was explicitly shared by the user and may also include profile information inferred by the social networking system 110. In one embodiment, a user profile includes multiple data fields, each describing one or more attributes of the corresponding user of the social networking system 110. Examples of information stored in a user profile include biographic, demographic, and other types of descriptive information, such as user profile images, work experience, educational history, gender, hobbies or preferences, location and the like. A user profile may also store other information provided by the user, for example, images or videos. In certain embodiments, user profile images of users may be tagged with identification information of users of the social networking system 110. A user profile in the user profile store 115 may also maintain references to actions by the corresponding user performed on content items in the content store 120 and stored in the user interaction store 130.

In embodiments, the user profile store 115 may include, for each user, an avatar, a screenname, and the user's real name. An avatar is an icon or figure representing a particular user in computer games, Internet forums, social networking systems, etc. A screenname is a unique sequence of characters that a user may choose to use for identification purposes when interacting with others online, as in computer games, instant messaging, forums, and via the social networking system 110.

The social networking system 110 may continuously update the user profile for a user with the geolocation of the user's client device 100. A user's geolocation may be determined by the social networking system 110 based on information sent by a client device's GPS chip and satellite data, which mapping services can map. When a GPS signal is unavailable, the social networking system 110 may use information from cell towers to triangulate a client device's position or GPS and cell site triangulation (and in some instances, local Wi-Fi networks) in combination to zero in on the location of the client device 100; this arrangement is called Assisted GPS (A-GPS). The social networking system 110 may also determine the geolocation distance between two client devices 100a and 100b by using the Haversine formula to calculate the great-circle distance between two points, as a straight line distance between the two client devices, which are associated with geolocation coordinates in terms of latitude and longitude, etc.

The content store 120 stores electronic media objects, which each represent various types of content. In one embodiment, objects in the content store 120 represent single pieces of content or content "items." Examples of content types represented by a content item include a page post, a status update, a photograph, a video, a link, a shared content item, a gaming application achievement, a check-in event at a local business, a brand page, etc. Social networking system 110 users may create content items stored by the content store 120, such as status updates, photos tagged by users to be associated with other content items in the social networking system, events, groups or applications. In some embodiments, content items are received from third-party applications or third-party applications separate from the social networking system 110. Users of the social networking system 110 are encouraged to communicate with each other by posting content items of various types of media through various sessions. This increases the amount of interaction of users with each other and increases the frequency with which users interact within the social networking system 110.

The user interaction manager 135 receives communications about user interactions internal to and/or external to the social networking system 110, populating the user interaction store 130 with information about user interactions. Interactions received by the user interaction manager 135 may include expressing an emotional preference for a content item by clicking on an icon representing a type of emotion, e.g., "like," "love," "haha," "wow," "sad," "angry," etc., sharing a content item from a client device 100a by sending it to the client device 100b of another user, commenting on a content item, checking-in to a physical location linked to a content item, joining a user group linked to a content item, adding a connection to another user, sending a message to another user, uploading an image, reading a message from another user, viewing content associated with another user, attending an event posted by another user, among others. In addition, a number of actions may involve a content item and one or more particular users, so these actions are associated with those users as well and stored in the user interaction store 130.

The user interaction manager 135 may determine the number of users $N_v$ of the social networking system currently viewing a particular content item from the received communications about user interactions internal to and/or external to the social networking system 110. The user interaction manager 135 may determine the time a user performed an interaction by a timestamp in the data representing the interaction sent by the client device 100 to the social networking system 110. The user interaction manager 135 may identify users within the social networking system 110 who each performed a user interaction with a content item within a certain time period.

The user interaction store 130 may be used by the social networking system 110 to track user interactions on the social networking system 110, as well as interactions on third party systems 112 that communicate information to the social networking system 110. Users may interact with various content items on the social networking system 110, and information describing these interactions is stored in the user interaction store 130. Examples of interactions with content items include: commenting on posts, sharing links, and checking-in to physical locations via a mobile device, accessing content items, etc. Additional examples of interactions with content items on the social networking system 110 that are included in the action store 130 include commenting on a photo album, communicating with a user, establishing a connection with an content item, joining an event to a calendar, joining a group, creating an event, authorizing an application, using an application, expressing a preference for an content item ("liking" the content item) and engaging in a transaction.

Each interaction of a user with a content item may have a type of emotion associated with the user interaction, e.g., "like," "love," "haha," "wow," "sad," "angry," etc. The user interaction store 130 may store icons corresponding to emotion types, where each icon includes information identifying an emotion type. Additionally, the user interaction store 130 may record a user's interactions with other applications operating on the social networking system 110. In some embodiments, data from the user interaction store 130 is used to infer interests or preferences of a user, augmenting the interests included in the user's user profile and allowing a more complete understanding of user preferences.

The social networking system 110 may determine the type of emotion associated with a user interaction with a content item performed by a user by storing a mapping from user interactions to types of emotions associated with the user interactions. For example a user interaction including a user clicking on a "heart" icon may map to an emotion type of "love." The social networking system 110 may store the mapping from user interactions to types of emotions as a mapping function, a mapping diagram, or a relational database, as described below with reference to FIGS. 7 and 8.

The social networking system 110 may receive, from a client device 100 of the user, the user interaction with the content item performed by the user. The social networking system 110 may identify the type of emotion corresponding to the received user interaction with the content item performed by the user based on the mapping.

In one embodiment, an edge store 125 stores information describing connections between users and other content items on the social networking system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with content items in the social networking system 110, such as when a user interacts with a content item by expressing a preference for the content item, where a type of emotion is associated with the user interaction, e.g., "like," "love," "haha," "wow," "sad," "angry," etc. Other edges are generated when users interact with content items in the social networking system 110, such as expressing interest in a page on the social networking system, sharing a link with other users of the social networking system, and commenting on posts made by other users of the social networking system.

In one embodiment, an edge may include various features each representing characteristics of interactions between users, interactions between users and content item, or interactions between content items. For example, features included in an edge describe the number of past interactions $I_{12}$ between a first user (client device 100a) and a second user (client device 100b), whether the number of past interactions $I_{12}$ exceed a threshold number ($I_{12}>T_{12}$), the rate of interaction between two users, how recently two users have interacted with each other, the rate or amount of information retrieved by one user about an content item, or the number and types of comments posted by a user about an content item. The features may also represent information describing a particular content item or user. For example, a feature may represent the level of interest that a user has in a particular topic, the rate at which the user logs into the social networking system 110, or information describing demographic information about a user. Each feature may be associated with a source content item or user, a target content item or user, and a feature value. A feature may be specified as an expression based on values describing the source content item or user, the target content item or user, or interactions between the source content item or user and target content item or user; hence, an edge may be represented as one or more feature expressions.

The edge store 135 also stores information about edges, such as affinity scores for content items, interests, and other users. Affinity scores, or "affinities," may be computed by the social networking system 110 over time to approximate a user's affinity for a type of emotion associated with user interactions, an content item, interest, and other users in the social networking system 110 based on the actions performed by the user. For example, if there are six types of emotion associated with user interactions—"like," "love," "haha," "wow," "sad," and "angry"—the edge store 135 may determine a user's affinity for the type of emotion "like" as the number of times the user interacted with content items by using the "like" emotion type ($N_{like}$) divided by the total number of times the user interacted with content items across all six reaction types (N). The edge store 135 may determine the user's affinity for the emotion type "like" as $N_{like}/N$. The social networking system 110 may determine whether the measure of affinity of the user for a reaction type (e.g., "like") exceeds a threshold number T, i.e., whether ($N_{like}/N)>T$.

The social networking system 110 may determine the topic of a content item from keywords in the content item. The topics of the social networking system 110 may be specified by a third-party system 112 or extracted by a topic extraction engine of the social networking system 110. In one embodiment, the social networking system 110 includes a topic extraction engine, which identifies one or more topics associated with content items in the content store 120. To identify topics associated with content items, the topic extraction engine identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine determines one or more topics associated with a content item maintained in the content store 120. The one or more topics associated with a content item are stored in the content store 120. Structured information associated with a content item may also be used to extract a topic associated with the content item.

The social networking system 100 may select two users based on an affinity between the first user (client device 100a) and the second user (client device 100b) based on their interactions with content items of a particular topic. The social networking system 100 may determine the number of past user interactions between users and content items corresponding to the topic. The social networking system 100 may select the user having the highest number of past user interactions between the user and content items corresponding to the topic.

Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific content item may be stored as a single edge in the edge store 125. Alternatively, each interaction between a user and a specific content item is stored as a separate edge. In some embodiments, connections between users may be stored in the user profile store 115, or the user profile store 115 may access the edge store 125 to determine connections between users.

The newsfeed manager 145 may generate content items for presentation to a user based on information in the user interaction store 130 and in the edge store 125 or may select candidate content items included in the content store 120. One or more of the candidate content items are selected and presented to the user by the newsfeed manager 145. For example, the newsfeed manager 145 receives a request to present one or more content items to a first user associated with a client device 100a. The newsfeed manager 145 accesses one or more of the user profile store 115, the content store 120, the user interaction store 130, and the edge store 125 to retrieve information about the first user (client device 100a). Stories or other data associated with users connected to the first user (client device 100a), e.g., a second user associated with a client device 100b, may be retrieved. The retrieved content items are analyzed by the newsfeed manager 145 to identify content likely to be relevant to the first user. For example, content items associated with users not connected to the first user or content items associated with users for which the first user has less than a threshold affinity are discarded. Based on various criteria, the newsfeed manager 145 selects one or more of the candidate content items for presentation to the first user.

The newsfeed manager 145 may also determine the order in which selected content items are presented via the newsfeed. For example, the newsfeed manager 145 determines that a user has a highest affinity for a specific user and increases the number of content items in the newsfeed associated with the specific user or modifies the positions in the newsfeed where content items associated with the specific user are presented. The newsfeed manager 145 may also account for actions by a user indicating a preference for topics of content items and selects content items having the same, or similar, topics for inclusion in the newsfeed. Additionally, the newsfeed manager 145 may analyze content items received by social networking system 110 from various users and obtain information about user preferences or interactions from the analyzed content items. This information may be used to refine subsequent selection of content items for newsfeeds presented to various users.

The user interface server 140 links the social networking system 110 via the network 105 to the one or more client devices 100, as well as to the one or more third party systems 112. The user interface server 140 serves web pages, as well as other web-related content, such as JAVA®, FLASH®, XML and so forth. The user interface server 140 may receive and route messages between the social networking system 110 and the client device 100, for example, instant messages, queued messages (e.g., email), text messages, short message service (SMS) messages, or messages sent using any other suitable messaging technique. A user may send a request to the user interface server 140 to upload information (e.g., images or videos) that are stored in the content store 120. Additionally, the user interface server 140 may provide application programming interface (API) functionality to send data directly to native client device operating systems, such as IOS®, ANDROID™, WEBOS® or RIM®.

The user interface server 140 generates user interfaces, such as web pages, with content from the social networking system 110. The user interfaces are displayed to the user through a client device 100 and network 105. The user interfaces provided by the user interface server 140 allows a user to generate content items and interact with content items stored by the content store 120. For example, a user interface may provide a method for a user to provide text, pictures, videos, links, and advertisements to be used to generate content items. The user interface server 140 configures a user interface based on the client device 100 used to present it. For example, a user interface for a smartphone with a touchscreen may be configured differently from a user interface for a web browser on a computer.

Process for Initiating a Private Session

Figure 2:
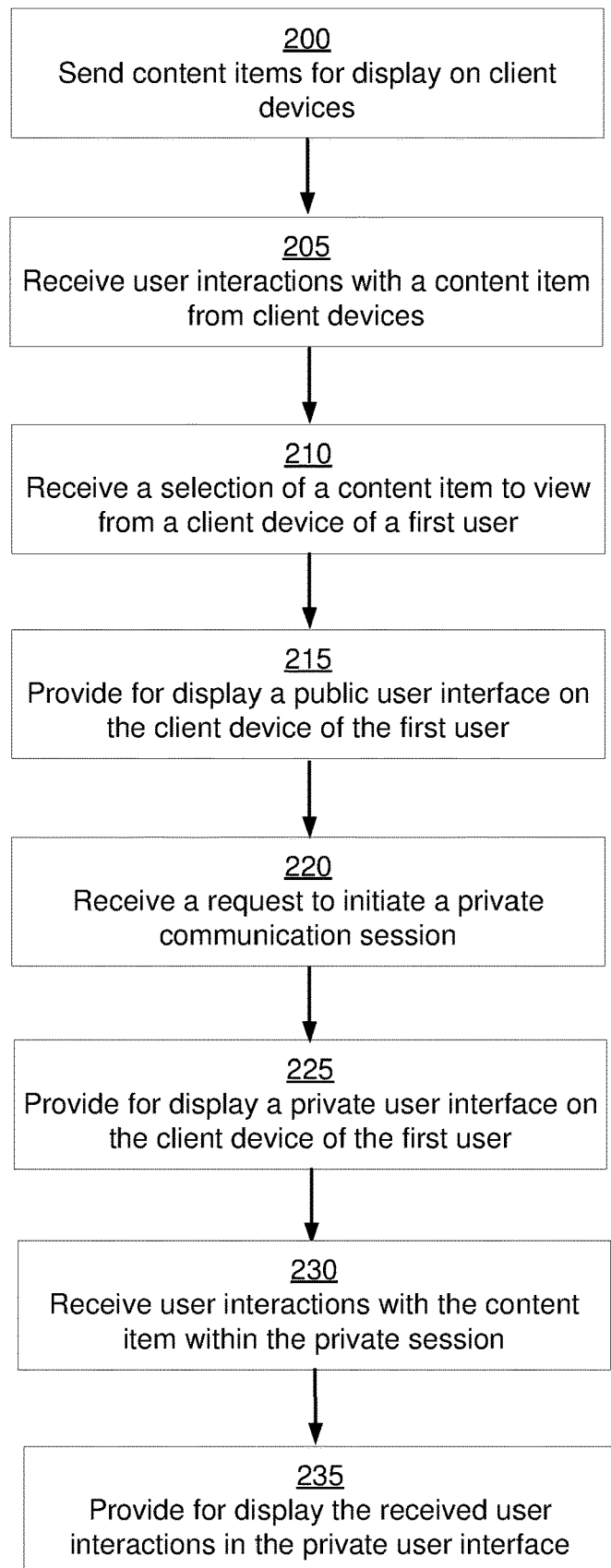
FIG. 2 is an illustration of the process for initiating a private session for content items in a social networking system, in accordance with an embodiment.

FIG. 2 is an illustration of the process for initiating a private session for content items in the social networking system 110, in accordance with an embodiment. In some embodiments, the process may have different and/or additional steps than those described in conjunction with FIG. 2. Steps of the process may be performed in different orders than the order described in conjunction with FIG. 2. Some steps may be executed in parallel. Alternatively, some of the steps may be executed in parallel and some steps executed sequentially. Alternatively, some steps may execute in a pipelined fashion such that execution of a step is started before the execution of a previous step.

The social networking system 110 sends 200, for display on client devices 100 of users of the social networking system 110, a content item amongst a plurality of content items associated with the users. The social networking system 110 receives 205 user interactions with the content item from the client devices 100 of the users. The social networking system 110 receives 210, from a client device 100a of a first user of the users of the social networking system 110, a selection of the content item to view.

In response to the selection, the social networking system 110 provides for display 215 on the client device 100a of the first user a public user interface displaying at least some of the received user interactions with the content item. The social networking system 110 receives 220, from the client device of the first user, a request to initiate a private session associated with the content item. The request identifies a subset of the users including the first user.

In response to the request from the first user, the social networking system 110 provides for display 225 on the client device 100a of the first user a private user interface for interacting with the content item by the identified subset of users. The social networking system 110 receives 230, within the private session, user interactions with the content item from client devices 100 of the subset of the users. The social networking system 110 provides for display 235 on the client device 100a of the first user, the received user interactions by the subset of users in the private user interface. The private user interface is configured to allow the first user to select between the public user interface and the private user interface.

Subsets of Social Networking Users

Figure 3:
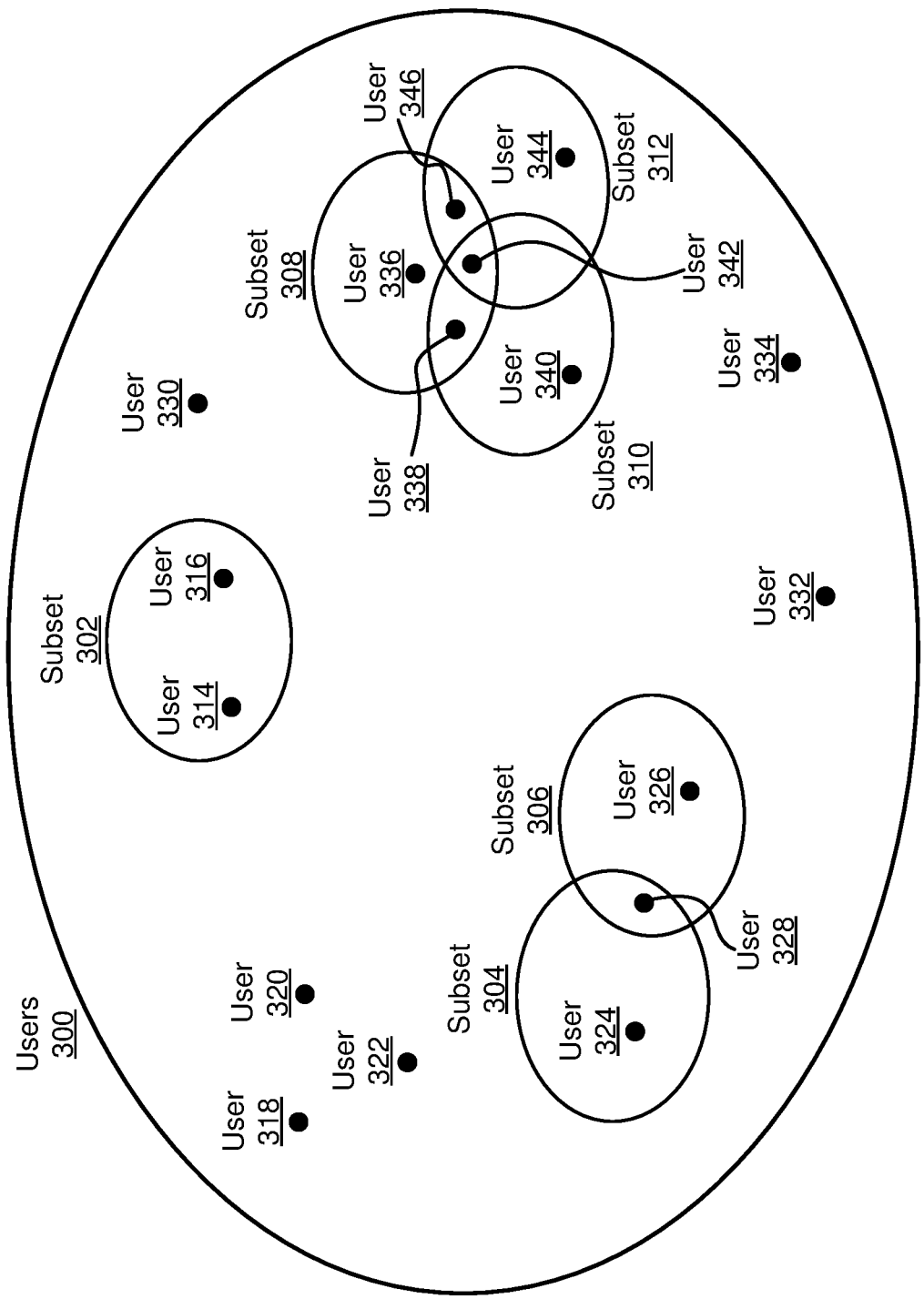
FIG. 3 is an illustration of subsets of users of the social networking system, in accordance with an embodiment.

FIG. 3 is an illustration of subsets of users of the social networking system 110, in accordance with an embodiment. The outer ellipse illustrates the users 300 of the social networking system 110. The smaller ellipses within the outer ellipse illustrate subsets of users, e.g., subset 302 of users includes user 314 and user 316; subset 304 includes users 324 and 328; and subset 306 includes user 328 and user 326. Some users, e.g., user 328, may be in two subsets, e.g., subset 304 and subset 306, which intersect. Subset of users 308 includes user 336, user 338, user 342, and user 346. Subset of users 310 includes user 338, user 342, and user 340. Subset of users 312 includes user 344, user 342, and user 346. Some users, e.g., user 342, may be in three or more subsets, e.g., subset 308, subset 310, and subset 312. Some users, e.g., users 318, 320, 322, 330, 332, and 334, may not be in any subset.

In an embodiment, a subset of the users includes only social networking connections of the other users in the subset. For example, subset 302 may include users 314 and 316 only if user 316 is a social networking connection of user 314. In an embodiment, a user in a subset may be denoted as a first user and the subset may include other users only if they are social networking connections of the first user. For example, user 324 in subset 304 may be denoted as a first user. The user 328 may be included in subset 304 only if user 328 is a social networking connection of user 324. User 326 may not be included in subset 304 even if user 326 is a social networking connection of user 328 because user 326 is not a social networking connection of the user 324 (denoted as the first user).

In an embodiment, the social networking system 110 may provide a recommended subset of the users 300 to the first user. For example, the social networking system 110 may provide a recommended subset of the users to a user 336 who has been denoted as a first user. The edge store 135 may, for a social networking connection c of a plurality of social networking connections of the first user 336, determine an affinity between the first user 336 and the social networking connection c of the first user as $A_{336\text{-}c}$. Responsive to the affinity $A_{336\text{-}c}$ exceeding a threshold T, the social networking system 110 may add the social networking connection c to the recommended subset of the users. For example, if the affinity $A_{336\text{-}338}$ between the first user 336 and the user 338 (who is a social networking connection of user 336) exceeds T, user 338 is added to the subset 308. User 330 who may also be a social networking connection of user 336 may not be added to subset 308 because the affinity $A_{336\text{-}330}$ between the first user 336 and the user 330 does not exceed T.

In an embodiment, the edge store 135 may, for each connection c of the social networking connections of a first user u, determine an affinity $A_{c\text{-}k}$ between the social networking connection c of the first user u and a content item k that both users are viewing. Responsive to the affinity $A_{c\text{-}k}$ exceeding a threshold T, the social networking system 110 may add the social networking connection c to the recommended subset of the users.

The social networking system 110 may also use the determination of such affinities by the edge store 135 to send a content item to a user who would not normally see it in their newsfeed created by the newsfeed manager 145. In embodiments, the social networking system 110 may create a ranking for content items for a user 314 based on the affinity $A_{314\text{-}k}$ of the user 314 for the content items k. The newsfeed manager 145 may normally send only certain content items having a higher ranking to the user 314 via the newsfeed of the user 314. The social networking system 110 may also create a ranking for social networking connections c of the user 314 based on affinities between the user 314 and the social networking connections c, denoted by $A_{314\text{-}c}$. When there is a low affinity $A_{316\text{-}k}$ between another user 316 (who is a social networking connection of user 314) and a content item k, the content item k may not normally be sent to the user 316 in the newsfeed of the user 316. But in cases where there is a high affinity $A_{314\text{-}316}$ between the user 314 and his or her social networking connection 316, and a high affinity between the user 314 and the content item k, but a low affinity between the connection user 316 and content item k, the social networking system 110 may modify the rankings and send the content item k to user 316 in the newsfeed of the user 316.

In embodiments, the social networking system 110 may also use the determination of such affinities by the edge store 135 to recommend users who are not social networking connections to become social networking connections of each other. For example, when there is a low affinity $A_{314\text{-}316}$ between two users 314 and 316 (who are not social networking connections), the user 316 may not normally be recommended to the user 314. But in cases where there are high affinities $A_{314\text{-}k}$ and $A_{316\text{-}k}$ between the user 314 and the content item k, and between the user 316 and the content item k, the social networking system 110 may modify the rankings and recommend the user 316 to the user 316 in a recommended subset of users. The social networking system 110 may create a triangle of edges (where each edge represents an affinity value) between two users and a content item, and increase the affinity value of an edge if the affinity values of the other two edges are high. For example, the first edge of the triangle denotes the affinity between user 314 and content item k, the second edge of the triangle denotes the affinity between user 316 and content item k, and the third edge of the triangle denotes the affinity between user 314 and user 316. If any two edges have a high affinity above a threshold, the value on the third edge may be ignored or incremented by the social networking system 110.

Figure 4:
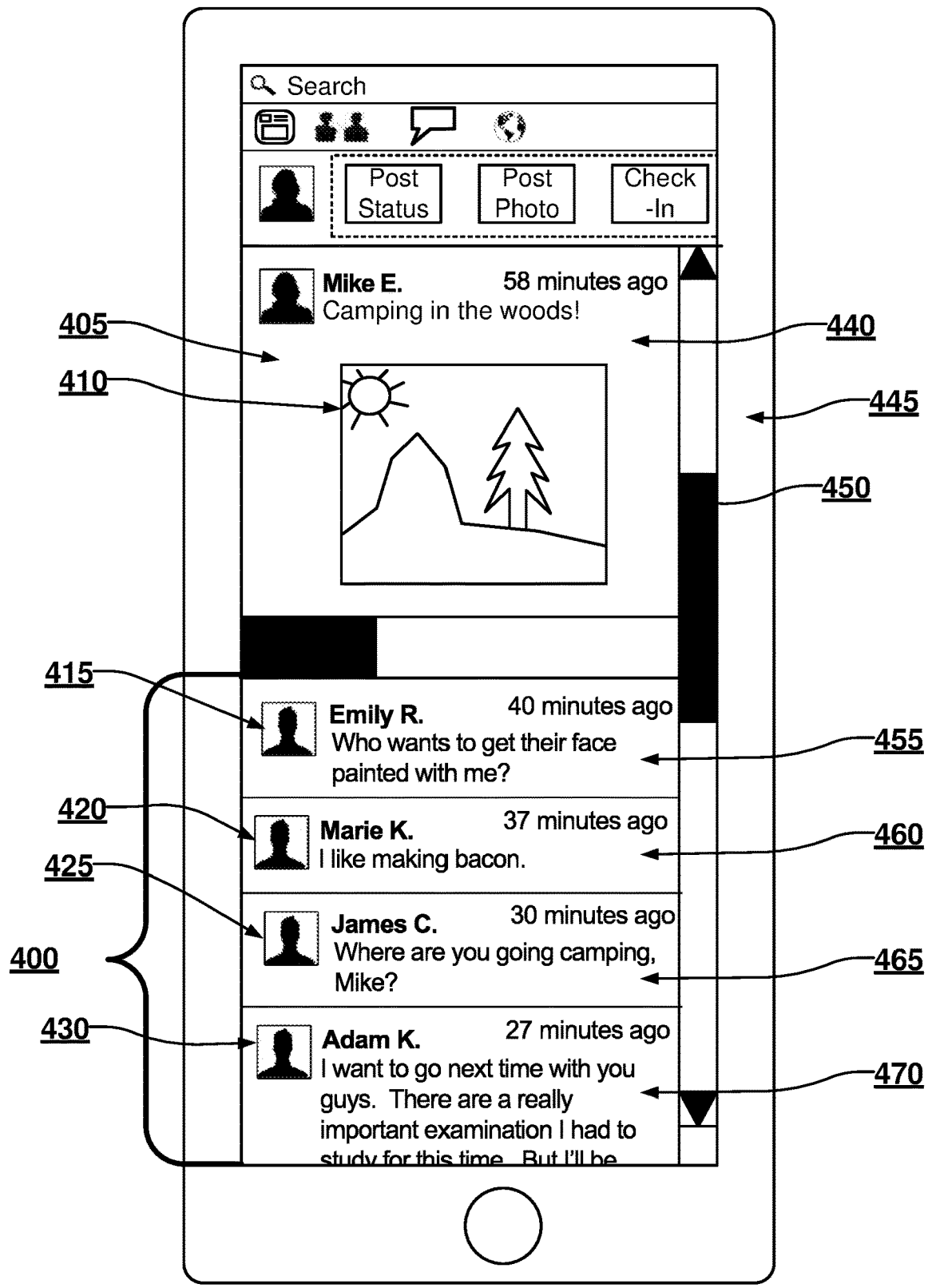
FIG. 4 is an illustration of a public user interface for user interactions with a content item displayed on a client device, in accordance with an embodiment.

Public User Interface for User Interactions with Content Item Displayed on Client Device FIG. 4 is an illustration of a public user interface for user interactions with a content item 405 displayed on a client device 100*a* of a user of a social networking system 110, in accordance with an embodiment. The client device 100*a* of the first user includes a display surface 440, a bezel 445, and a scrollbar 450 displayed on the display surface 440. The display surface 440 is the physical area of the client device 100*a* where content items, e.g., 405, from the social networking system 110 may be displayed.

The display surface 440 may be a liquid crystal display (LCD), organic light-emitting diode (OLED), active-matrix OLED (AMOLED), etc. In an LCD display surface 440, the light-modulating properties of liquid crystals display arbitrary images (as in a general-purpose computer display). In an OLED display surface 440, an emissive electroluminescent layer (a film of organic compound) emits light in response to an electric current. In an AMOLED display surface 440, an active matrix of OLED pixels that are deposited or integrated onto a TFT array generates light upon electrical activation. The bezel 445 shown in FIG. 4 is a non-display area that surrounds the display surface 440. The scrollbar 450 is a widget by which continuous text, pictures, or any other content items can be scrolled in a predetermined direction (up or down) on the display surface 440 so that all of the content items, e.g., 405, and user interactions (comments), e.g., 455, 460, 465, and 470, etc., can be viewed, even if only a few of the user interactions, e.g., 455, 460, and 465, can be fully seen on the display surface 440 at one time.

The social networking system 110 sends a content item 405 amongst a plurality of content items associated with the users, e.g., 415, 420, 425, and 430, etc., of the social networking system 110 for display on client devices, e.g., 100*a*, of the users. The content item 405 includes an image 410. The social networking system 110 receives user interactions, e.g., 455, 460, 465, and 470, with the content item 405 from the client devices of the users.

The social networking system 110 receives, from a client device 100*a* of a first user of the users of the social networking system, a selection of the content item 405 to view. For example, the selection can be in the form of a tap on the content item by a finger of the user. The screen 440 may have a capacitive touch surface to measure this tap and associate it with the content item 405. In response to the selection of the content item 405, the social networking system 110 provides for display on the client device 100*a* of the first user a public user interface 400 displaying at least some of the received user interactions, e.g., 455, 460, 465, and 470, with the content item 405. The user interactions on the public user interface 400 are visible to any user viewing the content item 405 on his or her client device.

Private User Interface

Figure 5:
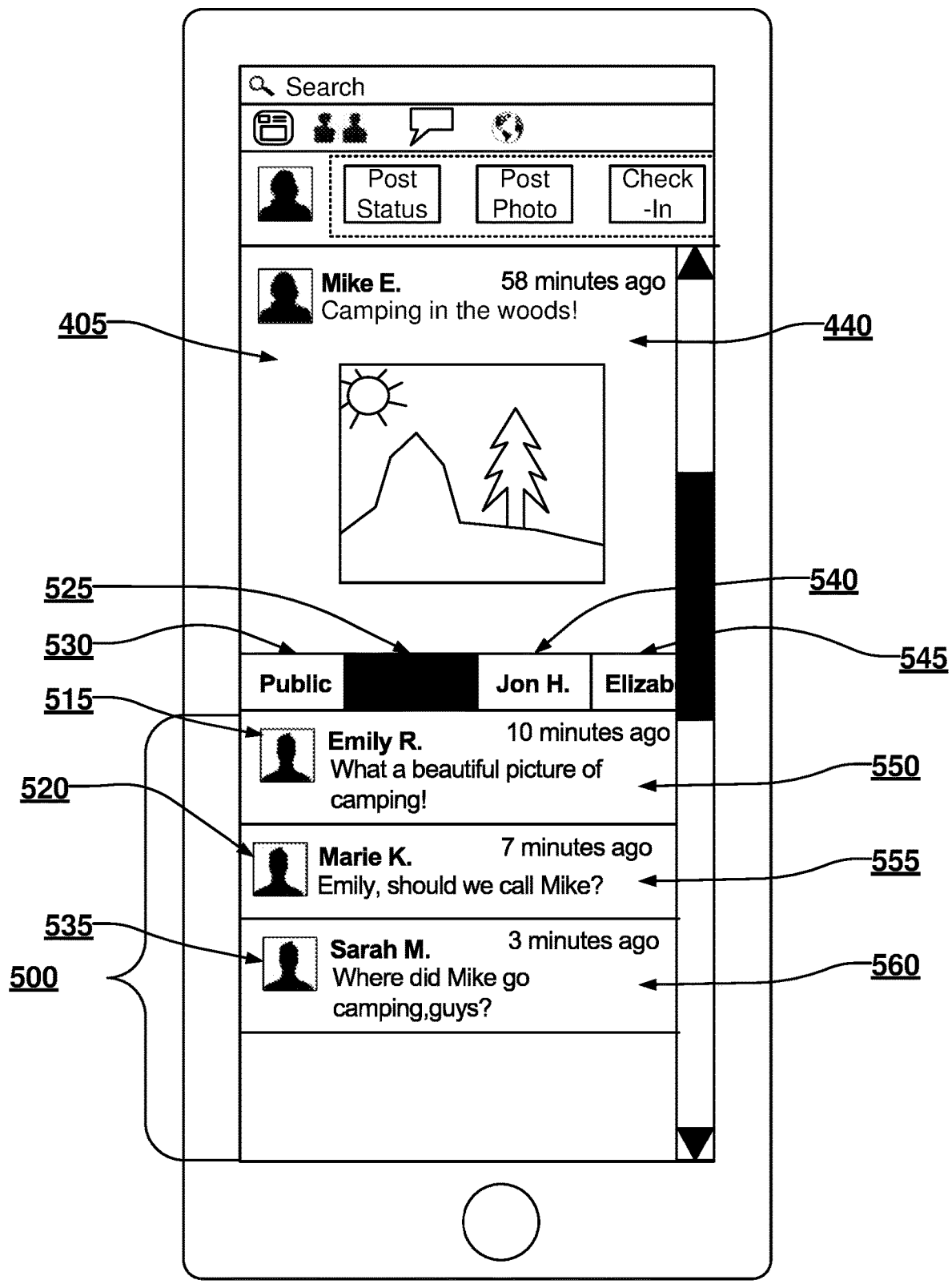
FIG. 5 is an illustration of a private user interface displayed on a client device of a user of a social networking system, in accordance with an embodiment.

FIG. 5 is an illustration of a private user interface 500 displayed on a client device 100*a* of a user of a social networking system 110, in accordance with an embodiment. The private user interface, e.g., 500, is provided for display on the client devices of only those users, e.g., users 515, 520, and 535, who belong to a subset of users associated with a private session corresponding to the private user interface 500.

In FIG. 5, the social networking system 110 receives, from a client device 100*a* of a first user 515 of the users of the social networking system 110, a selection of a content item 405 to view, as described above with reference to FIG. 4. The social networking system 110 receives, from the client device 100a of the first user 515, a request to initiate a private session associated with the content item 405. The request identifies a subset of the users (e.g., 515, 520, and 535, etc.) including the first user 515. For example, the request may be made by the user 515 touching an icon marked "initiate private user interface" on the display screen 440 of the client device 100a. The subset of the users (e.g., 515, 520, and 535, etc.) may be identified by the user tapping on user names in a directory of social networking contacts of the user 515.

In response to the request from the first user 515 on client device 100a, the social networking system 110 provides for display on the client device 100a of the first user 515 a private user interface 500 for interacting with the content item by the identified subset of users 515, 520, and 535, etc. The social networking system 110 receives, within the private session, user interactions (e.g., 550, 555, and 560) with the content item from client devices of the subset of the users (e.g., 515, 520, and 535, etc.). The social networking system 110 provides, for display on the client device 100a of the first user 515, the received user interactions (e.g., 550, 555, and 560) by the subset of users 515, 520, and 535 in the private user interface 500. The private user interface 500 is configured to allow the first user to select between the public user interface and the private user interface 500. The selection may be made by, for example, the user tapping on an icon corresponding to each interface. For example icon 525 corresponds to the private user interface 500. The icon 530 corresponds to a public user interface. The icons 540 and 545 correspond to private user interfaces initiated by other users of the social networking system.

The social networking system 110 may receive, from the client device 100a of the first user 515, a selection of one of the public user interface icon 530 and the private user interface icon 525. The social networking system 110 may receive, within a session corresponding to the selected one of the public user interface icon 530 and the private user interface icon 525, a user interaction 550 with the content item 405 from the client device 100a of the first user 515. The social networking system 110 sends for display, based on the selected one of the public user interface icon 530 and the private user interface icon 525, one of (1) the received user interaction 550 in the public user interface for display to the first user 515 and any of the users viewing the content item, and (2) the received user interaction 550 in the private user interface 500 for display to any of the subset of the users 515, 520, and 535 viewing the content item 405.

The social networking system 110 may receive, from a client device of a second user (e.g., user Jon H. in FIG. 5) of the users of the social networking system 110, a request to initiate a second private session associated with the content item 405. The request identifies a second subset of the users including the first user 515. The social networking system 110 provides for display, on the client device 100a of the first user 515, a second private user interface (corresponding to icon 540) for displaying user interactions by the second subset of users received within the second private session. The second private user interface (corresponding to icon 540) is positioned such that the first user can switch between the first 500 and second private user interfaces to view interactions of users involved in the first and second private sessions, respectively.

The social networking system 110 may determine a first affinity $A_{u\text{-}s1}$ between the first user u and the subset s1 of the users. The social networking system 110 may determine a second affinity $A_{u\text{-}s2}$ between the first user u and the second subset s2 of the users. The social networking system 110 may position the icon 540 corresponding to the second private user interface relative to the icon 525 corresponding to the private user interface 500 based on relative values of the first affinity $A_{u\text{-}s1}$ and the second affinity $A_{u\text{-}s2}$. For example, if the first affinity $A_{u\text{-}s1}$ is greater than the second affinity $A_{u\text{-}s2}$, the social networking system 110 may position the icon 540 corresponding to the second private user interface to the right of the icon 525 corresponding to the private user interface 500.

Process for Sending Real-Time User Interactions

Figure 6:
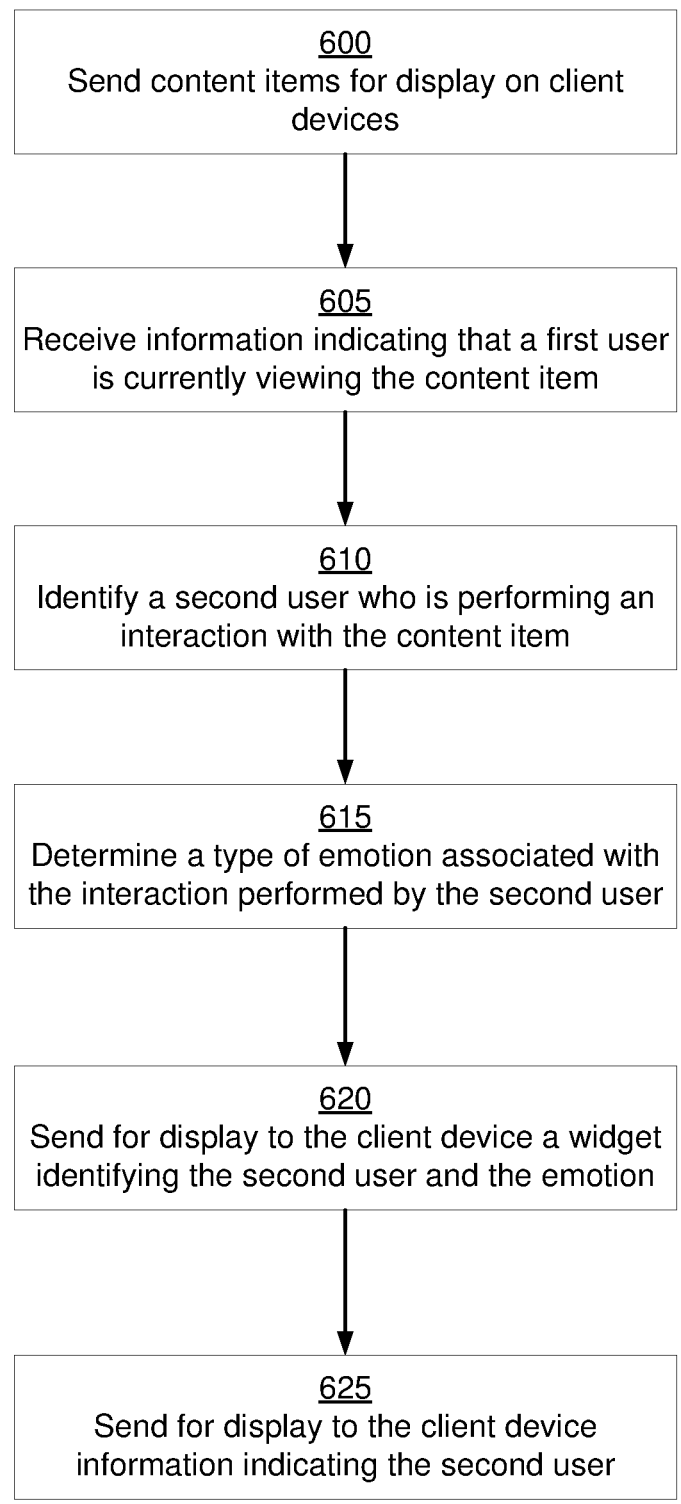
FIG. 6 is an illustration of the process for sending real-time user interactions with content items in a social networking system, in accordance with an embodiment.

FIG. 6 is an illustration of the process for sending real-time user interactions with content items in a social networking system 110, in accordance with an embodiment. In some embodiments, the process may have different and/or additional steps than those described in conjunction with FIG. 6. Steps of the process may be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

The social networking system 110 sends 600 a content item among other content items associated with the users of the social networking system 110 for display on client devices 100 of the users via the user interface server 140. The social networking system 110 receives 605, from a client device 100a of a first user of the social networking system 110, information indicating that the first user is currently viewing the content item. As one example, if the user has selected the content item in a newsfeed, the user can be directed to a content item page (e.g., a permalink) that displays the content item on a page along with the associated comments and a section that shows the reactions that have been received so far by other users on the content item. When the user selects the content item, the system 110 receives a notification of this, and when the user has this content item page open, the user is considered by the social networking system 110 to be currently viewing the content item. As another example, the social networking system 110 may include tracking pixels in the content items sent to client devices 100 such that when a content item is presented via a browser of a client device 100 (e.g., in a newsfeed with other content items), a particular program or code (or set of instructions) is executed by the browser. This code associated with a tracking pixel may cause a browser identifier associated with the client device 100 to be sent to the user interaction manager 135. A tracking pixel may be a transparent 1×1 image, an iframe, or other suitable user interface object. The user interaction store 130 may store the browser identifier associated with the user, information describing the user interaction performed, and a time stamp value indicating the time at which the user interaction was performed. As a further example, pixels and other tracking devices can be included in content items that fire to indicate when the content item is currently in view on the screen on a user's mobile phone.

Responsive to receiving the information, the social networking system 110 identifies 610 a second user (client device 100b) connected to the first user (client device 100a) within the social networking system 110, wherein the second user (client device 100b) is performing a user interaction with the content item while the first user is currently viewing the content item. The social networking system 110 determines 615 a type of emotion or reaction associated with the user interaction performed by the second user. The social networking system 110 sends 620 for display to the client device 100a of the first user, a widget identifying the second user (client device 100b) and/or identifying the type of emotion. A widget is a small on-screen icon with limited functionality that can be executed within a social media page. Widgets may be created in Dynamic Hypertext Markup Language (DHTML), Adobe Flash, etc. The widget is configured to move across the content item displayed on the client device 100a while the first user is currently viewing the content item.

Responsive to receiving from the client device a user interaction by the first user with the widget, the social networking system 110 sends 625 for display to the client device 100a information indicating the second user in a field for receiving comments by the first user. For example, if the first user taps on the icon/widget moving across the content item, the name of the second user appears in the comments field such that the first user can easily write a comment about the second user (or possibly about the second user's interaction/emotion that was displayed). In one embodiment, this entry of the second user's name in the comments field provides a tag of the second user by the first user in the comment, such that the second user is notified that the first user commented about her.

Sending a Content Item to a Client Device

Figure 7:
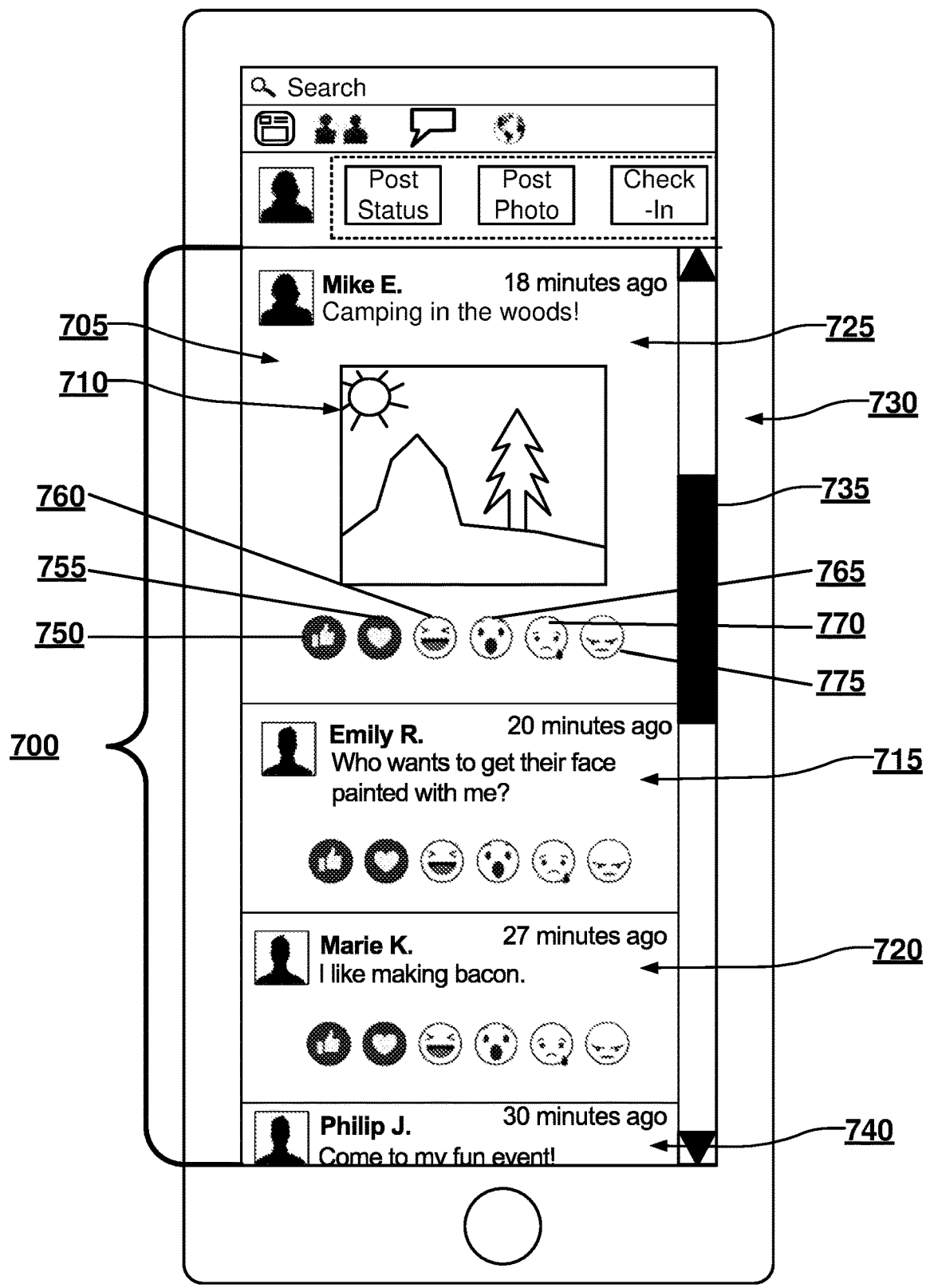
FIG. 7 is an illustration of a content item displayed on a client device of a user of a social networking system, in accordance with an embodiment.

FIG. 7 is an illustration of displaying a content item on a client device 100a of a first user of a social networking system 110, in accordance with an embodiment. The client device 100a of the first user includes a display surface 725, a bezel 730, and a scrollbar 735 displayed on the display surface 725. The bezel 730 shown in FIG. 7 is a non-display area that surrounds the display surface 725. The scrollbar 735 is a widget by which continuous text, pictures, or any other content items can be scrolled in a predetermined direction (up or down) on the display surface 725 so that all of the content items, e.g., 705, 715, 720, 740, etc., can be viewed, even if only a few of the content items, e.g., 705, 715, and 720, can be fully seen on the display surface 725 at one time.

The social networking system 110 sends a content item 705 amongst a plurality of content items, e.g., 715, 720, 740, etc., associated with the users of the social networking system 110 for display on client devices, e.g., 100a, of the users. The content item 705 includes an image 710. The content items 715, 720, and 740 include text as shown in FIG. 7. The user interaction manager 135 may determine a type of emotion associated with a user interaction with a content item 705 performed by a user using icons, e.g., icon 750, displayed within or adjacent to the content item 705.

The social networking system may store a mapping from user interactions to types of emotions associated with the user interactions. For example, if the first user (client device 100a) clicks on the icon 750, it may represent that the type of emotion associated with the user interaction with the content item 705 performed by the first user is "like." If the first user clicks on the icon 755, it may represent that the type of emotion associated with the user interaction with the content item 705 performed by the first user is "love." If the first user clicks on the icon 760, it may represent that the type of emotion associated with the user interaction with the content item 705 performed by the first user is "haha." If the first user clicks on the icon 765, it may represent that the type of emotion associated with the user interaction with the content item 705 performed by the first user is "wow." If the first user clicks on the icon 770, it may represent that the type of emotion associated with the user interaction with the content item 705 performed by the first user is "sad." If the first user clicks on the icon 775, it may represent that the type of emotion associated with the user interaction with the content item 705 performed by the first user is "angry."

The social networking system 110 may send the content item 705 for display in a newsfeed 700 on the client device 100a. The newsfeed manager 145 may present content items e.g., 715, 720, 740, etc., to the user through the newsfeed 700, which includes a plurality of content items selected for presentation to the user. In embodiments, the social networking system 110 may provide for display the content item 705 in a view of the content item 705 itself, called the permalink. In this view, no other content items would be displayed. A permalink (or permanent link) is a URL created by the social networking system 110 that is intended to remain unchanged, yielding a hyperlink that is less susceptible to link rot. Permalinks are often rendered simply, that is, as friendly URLs, so as to be easy for people to type and remember. Most modern blogging and content-syndication software systems support such links. Sometimes URL shortening is used to create them. A permalink is a type of persistent identifier and the word permalink is sometimes used as a synonym of persistent identifier. More often, though, permalink is applied to persistent identifiers which are generated by a social networking system 110 for pages served by that system.

The user interaction manager 135 may receive, from the client device 100a of the first user of the social networking system 110, information describing a user interaction indicating that the first user is currently viewing the content item 705. The information may be a click on the content item 705 or information conveying that the user is scrolling using the scrollbar 735 through the newsfeed 700 containing the content item 705 and has paused scrolling.

Identifying a Second User

Figure 8:
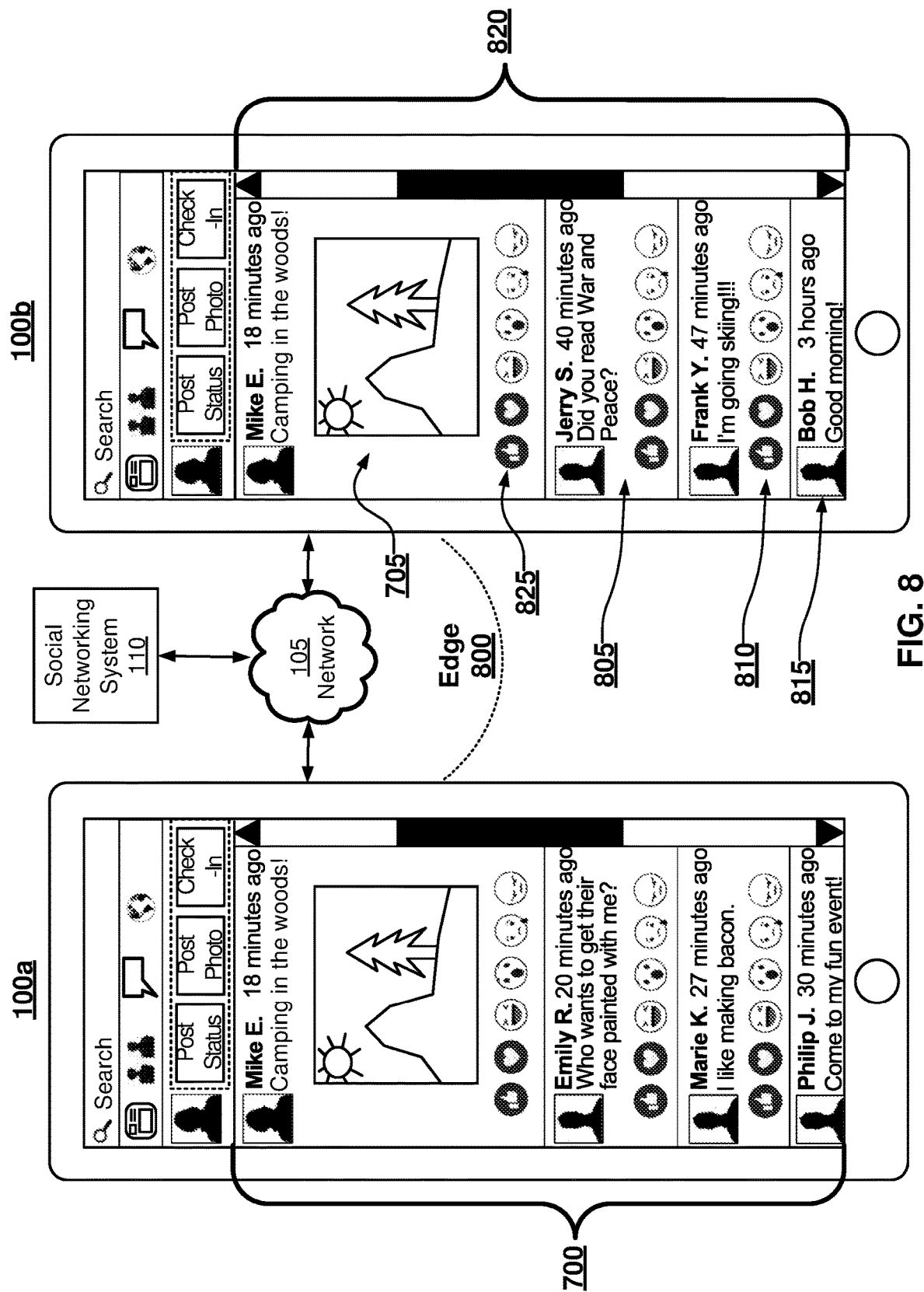
FIG. 8 is an illustration of a second user connected to a first user within the social networking system, in accordance with an embodiment.

FIG. 8 is an illustration of a second user (client device 100b) connected to the first user (client device 100a) within the social networking system 110, in accordance with an embodiment. Responsive to receiving, from the client device 100a, information indicating that the first user is currently viewing the content item 705, the social networking system 110 identifies one or more other users connected to the first user within the social networking system 110, wherein each of the one or more other users performed a user interaction with the content item 705 within a first time period $t_1$. The time period $t_1$ denotes the time period while the first user is currently viewing the content item. The social networking system identifies the one or more other users using information from the user interaction store 130, user interaction manager 135, user profile store 115, and edge store 125. The social networking system 110 selects a second user (client device 100b) from the one or more other users based on an affinity between the first user (client device 100a) and the second user.

The social networking system 110 may select the second user (client device 100b) from the one or more other users by determining a number $I_{1u}$ of past user interactions between a user u and the first user (client device 100a), for each user u of the one or more other users. The social networking system 110 may determine the number $I_{1u}$ of past user interactions from the edge store 125 and user interaction store 130. The social networking system 110 may identify the second user (client device 100b) as having the highest number of past user interactions $\text{Max}_u(I_{1u})$ between each user u and the first user.

The social networking system 110 may select the second user (client device 100b) from the one or more other users by determining a topic c of the content item 705, as described above with reference to FIG. 1. The social networking system 110 may, for each user u of the one or more other users, determining a number of past user interactions $I_{uc}$ between the user u and content items corresponding to the topic c, based on information from the content store 120, edge store 125, and user interaction store 130. The social networking system 110 may identify the second user as having the highest number of past user interactions $\text{Max}_u (I_{uc})$ between each user u and content items corresponding to the topic c.

The social networking system 110 may select the second user (client device 100b) from the one or more other users by, for each user u of the one or more other users, determining geolocation distances $G_{1u}$ between the client device 100a of the first user and the client devices (100b, 100c, etc.) of the other users, as described above with reference to FIG. 1. The social networking system 110 may identify the second user as having the smallest geolocation distance $\text{Min}_u(G_{1u})$ between the client device of each user u and the client device of the first user (client device 100a).

The social networking system 110 may determine the length of the first time period $t_1$ by storing a mapping from numbers of users $N_u$ to lengths of time period $t_1$. For example, if $N_u$ is between 10 and 20, then $t_1$ is 10 seconds. If $N_u$ is between 20 and 30, then $t_1$ may be 5 seconds. The mapping may be stored as a mapping function in which each element of the $N_u$ domain is paired with exactly one element in the $t_1$ domain. The mapping may be stored as a diagram including two parallel columns for numbers of users $N_u$ and lengths of time period $t_1$, respectively. The social networking system may also store the mapping as a relational database structured to recognize relations among stored items of information, e.g., numbers of users $N_u$ and lengths of time period $t_1$.

The social networking system 110 may determine the number of the one or more other users who interacted with content item 705 from the user interaction store 130 and user interaction manager 135. The social networking system 110 may identify the length of the first time period $t_1$ corresponding to the determined number of the one or more other users based on the mapping. This method provides the benefit of using a shorter time period $t_1$ when the number of the one or more other users who interacted with content item 705 is large. In this way, a lesser number of candidate users are selected for the system to initiate private sessions between. This method also provides the benefit of reduced computer processing to select the second user.

The identified second user is associated with client device 100b as shown in FIG. 8. The social networking system 110 communicates with client device 100b and client device 100a over the network 105, as illustrated and described earlier with reference to FIG. 1. The second user is a social networking connection of the first user (client device 100a) within the social networking system 110. The social networking system 110 may retrieve information from the edge store 125 describing social networking connections of the first user (client device 100a) as edges. The edge 800 shown in FIG. 8 shows that the second user (client device 100b) is connected to the first user (client device 100a).

In one embodiment, the second user, e.g., on client device 100b, may interact with content items, e.g., 705, in a newsfeed, e.g., 820. While the second user associated with client device 100b received the content item 705 in the newsfeed 820, as displayed on client device 100b, the other content items (805, 810 and 815) in the second user's newsfeed 820 are different from the content items in the newsfeed 700 in client device 100a. Each user may thus receive a distinct newsfeed. In the example shown in FIG. 8, the second user performed an interaction with the content item 705 by tapping on icon 825 within the first time period $t_1$. The type of emotion associated with the second user's interaction with the content item 705 is "like" (icon 825).

Widget Identifying the Second User

Figure 9:
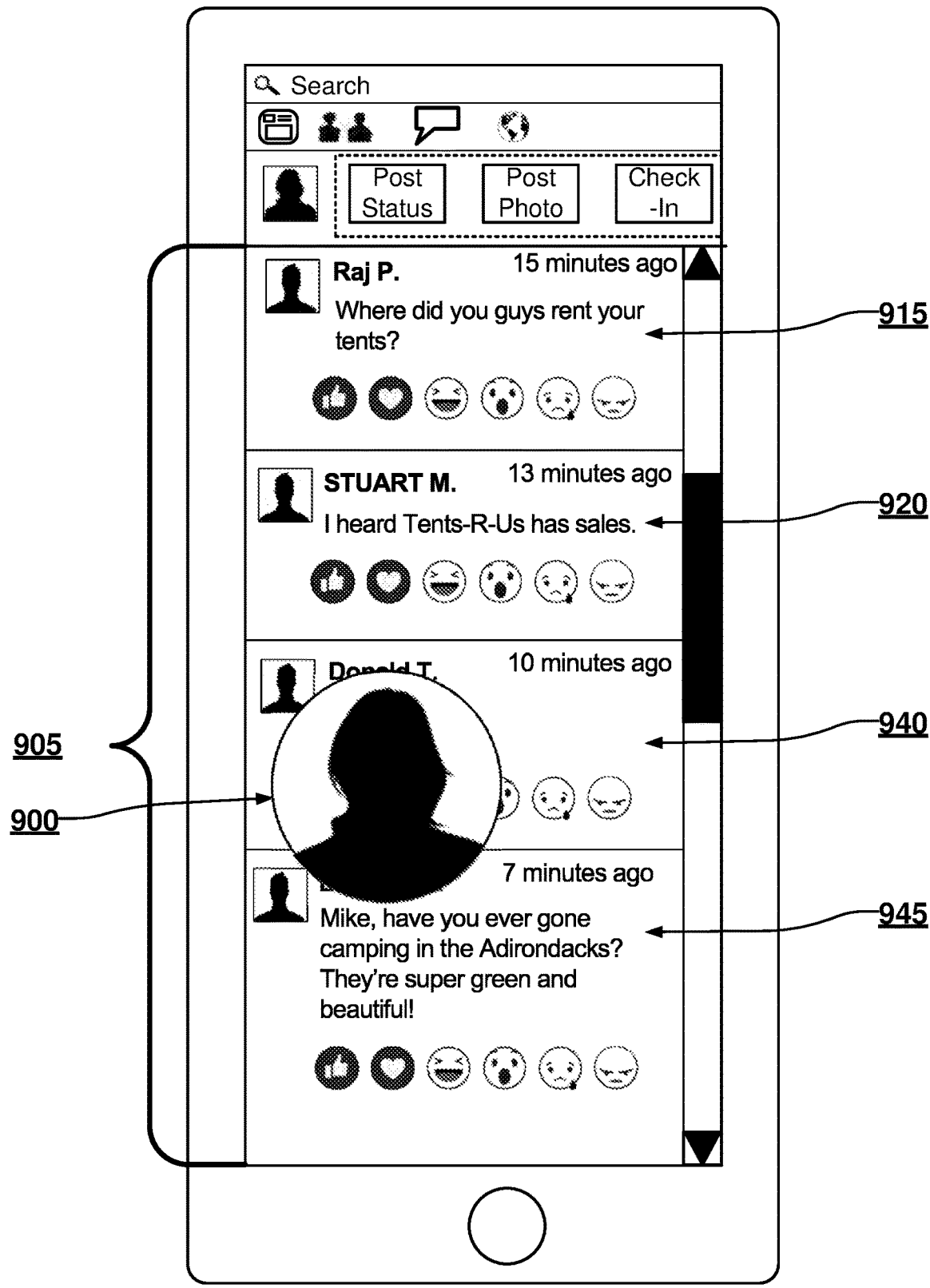
FIG. 9 is an illustration of a widget identifying the second user displayed on a client device of the first user of the social networking system, in accordance with an embodiment.

FIG. 9 is an illustration of a profile image 900 of the second user (client device 100b) in a permalink 905 of the content item 705, displayed on the device of the first user (client device 100a) of the social networking system 110, in accordance with an embodiment. The permalink 905 is visible on client device 100a because the first user selected content item 705 on client device 100a. The profile image 900 of the second user may be displayed as a widget. The social networking system 110 sends for display to the client device of the first user (client device 100a), one or more widgets 900 including information identifying the second user (client device 100b). As shown in FIG. 9, the first user has scrolled down the permalink 905 to view comments 915, 920, etc. Content item 705 (above comment 915 in the permalink 905) is no longer visible on client device 100a. Other comments 940 and 945 for content item 705 are now visible lower in the permalink 905.

The information identifying the second user (client device 100b) may include a profile image 900 of the second user, an avatar of the second user, text representing the second user's name, coordinates representing the second user's geolocation, or a screenname of the second user, all obtained from the user profile store 115. The coordinates may be part of a coordinate system that enables every location on Earth to be specified by a set of numbers, letters or symbols. The coordinates representing the second user's geolocation may be latitude, longitude, altitude, GPS coordinates, etc. In embodiments, the widget 900 may be displayed in a permalink on client device 100a.

Some benefits and advantages of this method are that the first user (client device 100a) can efficiently be notified in real-time of other users' interactions with the content item 705. One benefit over conventional methods is that in conventional methods, the first user (client device 100a) may not see interactions that would be of interest to him or her because the interactions of interest may be aggregated with other interactions or because the number of interactions with the content item is too large. The first user will see other users' interactions in real time, thereby enabling the first user to interact with other users' interactions in a timely way. In addition, even if the first user is scrolling down his or her newsfeed 700 or permalink 905, as shown in FIG. 9, and the content item 705 is not visible, he or she will still be notified of an interaction from another user because the notification of the interaction will be displayed via a widget 900 on the client device 100a and not at the very top of the permalink 905 near the content item 705, which is not visible to the first user. In embodiments, the widgets 900 displayed move or float across the screen to capture the first user's attention.

Icon Identifying a Type of Emotion

Figure 10:
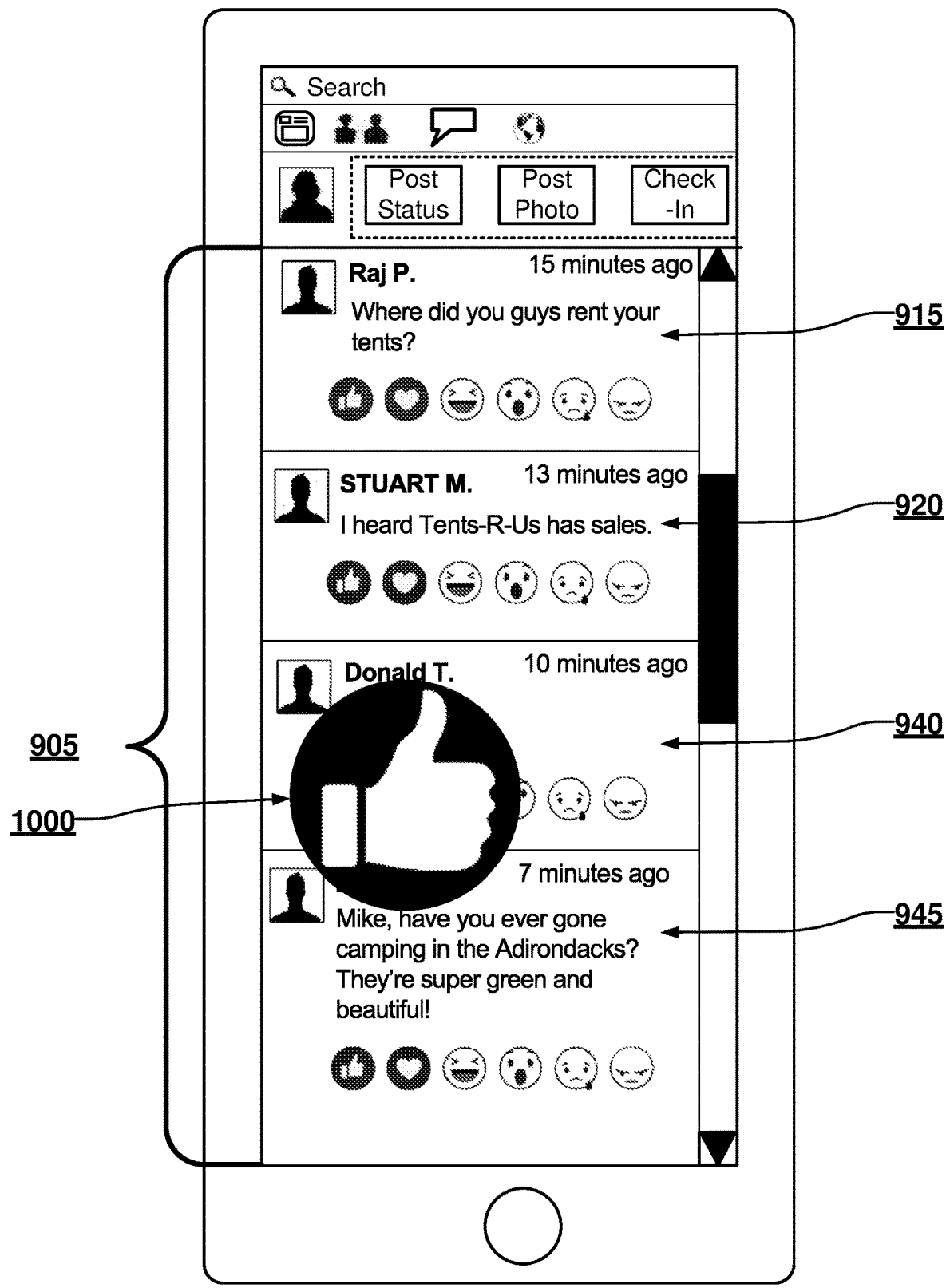
FIG. 10 is an illustration of a widget identifying a type of emotion associated with a user interaction displayed on a client device of a user of the social networking system, in accordance with an embodiment.

FIG. 10 is an illustration of a widget 1000 identifying a type of emotion, associated with the reaction of the second user, in the permalink 905 displayed on a client device 100a of a user of the social networking system 110, in accordance with an embodiment. The icon 1000 may be a widget identifying a type of emotion associated with the second user's interaction. The social networking system 110 may store a mapping from user interactions to types of emotions associated with the user interactions, as illustrated and described above with reference to FIG. 7. The social networking system 110 may store the mapping from user interactions to types of emotions as a mapping function, a mapping diagram, or a relational database, as described above with reference to FIG. 8. The social networking system 110 may receive, from the client device 100b of the second user, the user interaction with the content item 705 performed by the second user. The social networking system 110 may identify the type of emotion corresponding to the received user interaction with the content item 705 performed by the second user based on the mapping. In the example shown in FIG. 10, the type of emotion corresponding to the user interaction with the content item 705 performed by the second user is "like." In one embodiment, the user profile image icon 900 from FIG. 9 turns into the emotion icon 1000 at some point as it moves across the permalink 905. In some embodiments, only the profile image 900 icon or only the emotion icon 1000 is provided. The icons, e.g., 900 or 1000, can float across the page, such as from the bottom to the top of the page, or otherwise move to attract the viewing user's attention.

The social networking system 110 may send to the first user (client device 100a) one or more widgets, such as the icon 1000 representing an emotion associated with the second user's interaction, as shown in FIG. 10, or text representing the type of emotion associated with the user interaction, e.g., "LIKE." The one or more widgets 1000 representing an emotion may be sent by the social networking system 110 to the first user's device 100a, such that they appear after the one or more widgets 900 identifying the second user in time, illustrated above with reference to FIG. 9. The one or more widgets 1000 representing an emotion may be superimposed on the one or more widgets 900 identifying the second user. In embodiments, the widgets 900 and 1000 displayed move across the screen to capture the first user's attention.

The widgets 1000 may be configured to receive a user interaction from the client device of the first user (client device 100a) within a second time period $t_2$. The length of the second time period $t_2$ may be determined by the social networking system 110 based on the number of the one or more other users who performed a user interaction with the content item 305 within the first time period $t_1$. The length of the second time period $t_2$ may decrease as the number of the one or more other users increases. This method provides the benefit of using a shorter time period for the first user to respond and for the social networking system 110 to initiate a private session when the number of candidate second users who interacted with content item 705 is large. In this way, if the first user does not respond within the second time period $t_2$, the social networking system may stop displaying the widgets 1000 and may provide other widgets identifying another user (e.g., client device 100c) who performed a user interaction with content item 705 within the first time period $t_1$, as described above with reference to FIG. 8.

Automatic Identification of the Second User in a Comments Field

Figure 11:
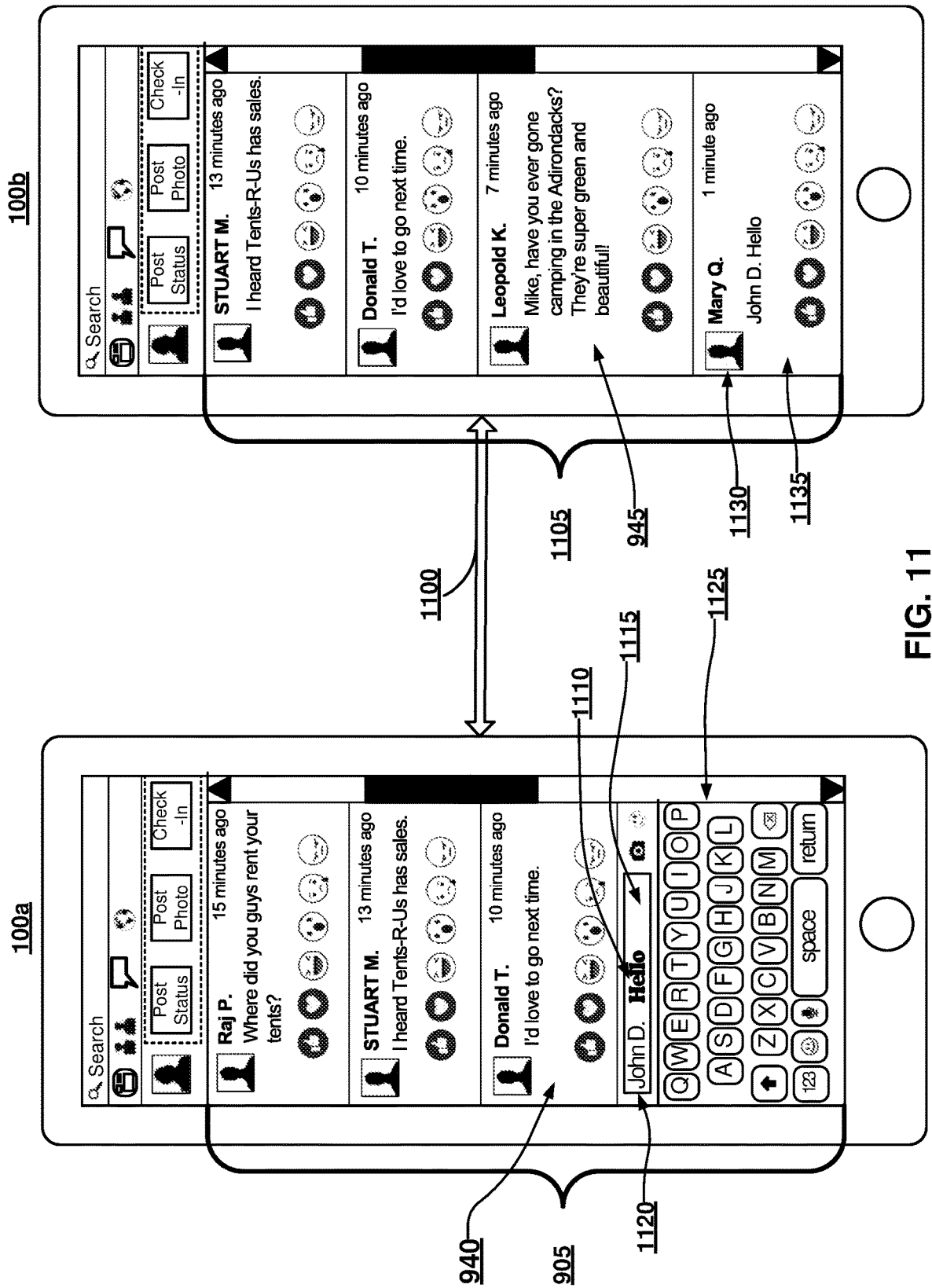
FIG. 11 is an illustration of a field for receiving comments by the first user on a client device, in accordance with an embodiment.

FIG. 11 is an illustration of a field 1115 for receiving comments by the first user on the client device 100a, in accordance with an embodiment. The field 1115 contains information 1120 indicating the identity of the second user on the first user's device 100a to communicate with the second user's device 100b. Responsive to receiving, from the client device of the first user (client device 100a), a user interaction with the one or more widgets 1000 within the second time period $t_2$, the user interface server 140 sends for display to the client device 100a information 1120 indicating the second user in the field 1115 for receiving comments by the first user.

The user interface server 140 may configure for display on the client device 100a of the first user the field 1115 and a text user interface 1125 for entering a comment 1110 directed to the second user indicated by name 1120. In one embodiment, the text user interface 1125 is displayed at the bottom of the permalink 905 on the client device 110a. Because the icon 1000 (shown in FIG. 10) is no longer visible after the first user has interacted with it, the entire comment 940 (partially hidden by the icon 1000 in FIG. 10) is now visible in the permalink 905 on client device 100a. When the social networking system 110 displays the field 1115 and configures for display the text user interface 1125, it may pre-enter text characters 1120 corresponding to the second user's name or screenname in the text user interface 1125 as shown in FIG. 11. This ensures that any comment 1110 entered at the client device 100a tags the second user on client device 100b. If the first user provides a text comment 1110, the online networking system 110 provides for display to the first user and the second user the comment 1110. For example, the comment 1110 appears as a comment 1135 at the bottom of the screen of the client device 100b of the second user in FIG. 11. The identity of the sending first user 1130 is also displayed in comment 1135.

In an embodiment, the comment 1110 may be displayed as an incoming text message on the client device 100b of the second user. In an embodiment, the user interface server 140 may initiate a private session 1100 between the client device 100a of the first user and the client device of the second user 100b. The advantage of this method is that it allows the first and second users to interact privately and in real time based on the emotion associated with the second user's interaction with the content item 705. The social networking system 110 may initiate the private session 1100 as part of protocols and services at the application layer, at the session layer, or at the transport layer in the Open Systems Interconnection (OSI) model. The social networking system 110 may initiate the private session 1100 using the Session Initiation Protocol (SIP), a communications protocol for signaling and controlling voice and video calls. The session 1100 may be initiated over Internet Protocol (IP) networks. The session 1100 may employ design elements similar to the HTTP request/response transaction model. Each message sent by the client device 100a or 100b may include a client request that invokes a particular method or function on the user interface server 140 and at least one response.

In an embodiment, the user interface server 140 may configure for display on the client device 100a of the first user a user interface for interacting with the client device 100b of the second user via the private session. The user interface may include a text messaging interface 1125, a video chat interface, a telephone call interface, etc. The text messaging interface 1125, illustrated in FIG. 11 may be an interface for sending electronic messages, consisting of alphabetic and numeric characters over a cellular phone network, cable network, Local Area Network, etc. The text messaging interface 1125 may include messages sent using the Short Message Service (SMS), multimedia messages (known as MMS) containing digital images, videos, and sound content, as well as ideograms known as emoji (happy faces and other icons). When the social networking system 110 displays the field 1115 and configures for display the text messaging interface 1125, it may pre-enter text characters corresponding to the second user's name 1120 or screenname in the text messaging interface 1125 as shown in FIG. 11. This ensures that any message sent by the client device 100a within the private session 1100 is received only by client device 100b or another client device associated with the second user. If the first user provides a text comment 1110, the online networking system 110 provides for display to the first user and the second user the comment 1110. The comment 1110 is displayed as an incoming message on the client device 100b of the second user. The message includes the name or screenname of the sender of the message 1115 (i.e., the first user).

In embodiments, the social networking system may configure for display a video chat interface on the client device 100a that enables the reception and transmission of audio-video signals by the client device 100a and client device 100b at different locations, for communication between the first user and second in real-time. In embodiments, the private session 1100 may include sending still images between client devices every few seconds. The advantage of this method is that in commercial and corporate settings, it may facilitate meetings and conferences, typically between parties that already have established relationships on the social networking system 110. As a result, by reducing the need to travel to bring people together the method also contributes to reductions in carbon emissions.

In embodiments, the social networking system 110 may configure for display on the client device 100a a telephone call interface for setting up a phone call over a cellular network. The private session 1100 may thus be initiated as part of a communication network where the last link is wireless. In this example, the private session is distributed over land cells, where each cell is served by at least one fixed-location transceiver, known as a cell site or base station.

In embodiments, the content items, icons, widgets, text messaging interface, video chat interface, telephone call interface, etc., disclosed herein are sent or configured for display by the social networking system 110 for display in a newsfeed. In embodiments, the content items, icons, widgets, text messaging interface, video chat interface, telephone call interface, etc., are sent or configured for display by the social networking system 110 for display in a permalink, e.g., 905.

Alternate Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    sending, for display on client devices of users of a social networking system, a content item amongst a plurality of content items associated with the users, wherein content items comprise displayable electronic media objects; and
    responsive to a first user viewing the content item:
        identifying one or more other users connected to the first user within the social networking system, each of the one or more other users performing a user interaction with the content item while the first user is currently viewing the content item;
        selecting a second user from the one or more other users based on an affinity between the first user and the second user;
        sending for display to a client device of the first user a widget identifying the second user who performed the user interaction, the widget configured to move across the content item displayed on the client device while the first user is currently viewing the content item, wherein the widget is an on-screen icon configured to receive user interactions; and
        responsive to receiving from the client device a second user interaction with the widget by the first user, sending for display to the client device information indicating the second user in a field for receiving comments by the first user.

2. The method of claim 1, wherein the sending for display to the client device a widget identifying the second user who performed the user interaction comprises:
    sending for display to the client device one or more of a profile image of the second user, an avatar of the second user, text representing the second user's name, coordinates representing the second user's geolocation, and a screenname of the second user; and responsive to the sending for display to the client device, sending for display to the client device an icon identifying the user interaction.

3. The method of claim 1, wherein the second user interaction received from the client device by the first user comprises one or more of:
tapping on the widget;
mousing over the widget; and
hovering over the widget.

4. The method of claim 1, wherein the selecting the second user comprises:
for each user of the one or more other users, determining a number of past user interactions between the user and the first user; and
identifying a user of the one or more other users having a highest number of past user interactions between the one or more other users and the first user.

5. The method of claim 1, wherein the selecting the second user comprises:
determining a topic of the content item;
for each user of the one or more other users, determining a number of past user interactions between the user and content items corresponding to the topic; and
identifying a user of the one or more other users having a highest number of past user interactions between the one or more other users and content items corresponding to the topic.

6. The method of claim 1, wherein the selecting the second user comprises:
for each user of the one or more other users, determining a geolocation distance between a client device of the user and the client device of the first user; and
identifying a user of the one or more other users having a smallest geolocation distance between client devices of the one or more other users and the client device of the first user.

7. A method comprising:
sending, for display on client devices of users of a social networking system, a content item amongst a plurality of content items associated with the users, wherein content items comprise displayable electronic media objects; and
responsive to a first user viewing the content item:
identifying a second user connected to the first user in the social networking system, the second user performing a user interaction with the content item while the first user is currently viewing the content item;
sending for display to a client device of the first user a widget identifying the second user who performed the user interaction, the widget configured to move across the content item displayed on the client device while the first user is currently viewing the content item, wherein the widget is an on-screen icon configured to receive user interactions; and
responsive to receiving from the client device a second user interaction with the widget by the first user, sending for display to the client device information indicating the second user in a field for receiving comments by the first user.

8. The method of claim 7, wherein the sending for display to the client device a widget identifying the second user who performed the user interaction comprises:

sending for display to the client device one or more of a profile image of the second user, an avatar of the second user, text representing the second user's name, coordinates representing the second user's geolocation, and a screenname of the second user; and responsive to the sending for display to the client device the information, sending for display to the client device an icon identifying the user interaction.

9. The method of claim 7, wherein the second user interaction received from the client device by the first user comprises one or more of:
tapping on the widget;
mousing over the widget; and
hovering over the widget.

10. The method of claim 7, wherein the identifying the second user comprises:
identifying one or more other users connected to the first user within the social networking system, each of the one or more other users performing one or more user interactions with the content item while the first user is currently viewing the content item;
selecting the second user from the one or more other users based on an affinity between the first user and the second user.

11. The method of claim 10, wherein the selecting the second user comprises:
for each user of the one or more other users, determining a number of past user interactions between the user and the first user; and
identifying a user of the one or more other users having a highest number of past user interactions between the one or more other users and the first user.

12. The method of claim 10, wherein the selecting the second user comprises:
determining a topic of the content item;
for each user of the one or more other users, determining a number of past user interactions between the user and content items corresponding to the topic; and
identifying a user of the one or more other users having a highest number of past user interactions between the one or more other users and content items corresponding to the topic.

13. The method of claim 10, wherein the selecting the second user comprises:
for each user of the one or more other users, determining a geolocation distance between a client device of the user and the client device of the first user; and
identifying a user of the one or more other users having a smallest geolocation distance between client devices of the one or more other users and the client device of the first user.

14. The method of claim 7, wherein the user interaction performed by the second user comprises the second user clicking on an icon representing the user interaction.

15. The method of claim 7, wherein the user interaction performed by the second user comprises one or more of:
the second user clicking on an icon representing the user interaction;
the second user sharing the content item by sending it to the client device of the first user;
the second user commenting on the content item;
the second user checking-in to a physical location linked to the content item; and
the second user joining a user group linked to the content item.

16. A non-transitory computer-readable storage medium comprising instructions executable by a processor, the instructions comprising:
> sending, for display on client devices of users of a social networking system, a content item amongst a plurality of content items associated with the users, wherein content items comprise displayable electronic media objects; and
> responsive to a first user viewing the content item:
>> identifying a second user connected to the first user in the social networking system, the second user performing a user interaction with the content item while the first user is currently viewing the content item;
>> sending for display to a client device of the first user a widget identifying the second user who performed the user interaction, the widget configured to move across the content item displayed on the client device while the first user is currently viewing the content item, wherein the widget is an on-screen icon configured to receive user interactions; and
>> responsive to receiving from the client device a second user interaction with the widget by the first user, sending for display to the client device information indicating the second user in a field for receiving comments by the first user.

17. The non-transitory computer-readable storage medium of claim 16, wherein the sending for display to the client device a widget identifying the second user who performed the user interaction comprises:
> sending for display to the client device one or more of a profile image of the second user, an avatar of the second user, text representing the second user's name, coordinates representing the second user's geolocation, and a screenname of the second user; and
> responsive to the sending for display to the client device the information, sending for display to the client device an icon identifying the user interaction.

18. The non-transitory computer-readable storage medium of claim 16, wherein the second user interaction received from the client device by the first user comprises one or more of:
> tapping on the widget;
> mousing over the widget; and
> hovering over the widget.

19. The non-transitory computer-readable storage medium of claim 16, wherein the identifying the second user comprises:
> identifying one or more other users connected to the first user within the social networking system, each of the one or more other users performing one or more user interactions with the content item while the first user is currently viewing the content item;
> selecting the second user from the one or more other users based on an affinity between the first user and the second user.

20. The method of claim 16, wherein the user interaction performed by the second user comprises the second user clicking on an icon representing the user interaction.

* * * * *

UNITED STATES PATENT AND TRADEMARK OFFICE
CERTIFICATE OF CORRECTION

PATENT NO. : 10,955,990 B2
APPLICATION NO. : 16/401566
DATED : March 23, 2021
INVENTOR(S) : Robin Maxime Clediere Page 1 of 1

It is certified that error appears in the above-identified patent and that said Letters Patent is hereby corrected as shown below:

In the Claims

In Column 26, Claim 20, Line 27, delete "method of claim" and insert -- non-transitory computer-readable storage medium of claim --, therefor.

Signed and Sealed this
Sixth Day of July, 2021

Drew Hirshfeld
*Performing the Functions and Duties of the
Under Secretary of Commerce for Intellectual Property and
Director of the United States Patent and Trademark Office*